United States Patent
Yoo et al.

(10) Patent No.: US 10,013,778 B2
(45) Date of Patent: Jul. 3, 2018

(54) TOMOGRAPHY APPARATUS AND METHOD OF RECONSTRUCTING TOMOGRAPHY IMAGE BY USING THE TOMOGRAPHY APPARATUS

(71) Applicant: SAMSUNG ELECTRONICS CO., LTD., Suwon-si (KR)

(72) Inventors: Sang-wook Yoo, Yongin-si (KR); Ajay Narayanan, Suwon-si (KR); Toshihiro Rifu, Suwon-si (KR); Gun-woo Lee, Seoul (KR); Jong-hyon Yi, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 118 days.

(21) Appl. No.: 15/084,709

(22) Filed: Mar. 30, 2016

(65) Prior Publication Data
US 2016/0300370 A1 Oct. 13, 2016

(30) Foreign Application Priority Data
Apr. 9, 2015 (KR) .................. 10-2015-0050238

(51) Int. Cl.
*G06T 11/00* (2006.01)
*G06T 7/00* (2017.01)
(Continued)

(52) U.S. Cl.
CPC ............ *G06T 11/006* (2013.01); *G06T 5/003* (2013.01); *G06T 2207/10081* (2013.01); *G06T 2207/20201* (2013.01)

(58) Field of Classification Search
CPC ..... G06T 11/006; G06T 2211/40; G06T 5/00; G06T 5/003; G06T 2207/20201;
(Continued)

(56) References Cited

U.S. PATENT DOCUMENTS 5,873,830 A 2/1999 Hossack et al.
5,919,138 A 7/1999 Ustuner
(Continued)

FOREIGN PATENT DOCUMENTS

JP 2012-236005 A 12/2012
KR 10-2010-0004321 A 1/2010
(Continued)

OTHER PUBLICATIONS

Asma et al. "Quantitatively Accurate Image Reconstruction for Clinical Whole-Body PET Imaging." Asia-Pacific Signal & Information Processing Annual Summit and Conference, Dec. 3, 2012, 9 pages.*

(Continued)

*Primary Examiner* — Jon Chang
(74) *Attorney, Agent, or Firm* — Sughrue Mion, PLLC

(57) ABSTRACT

A tomography apparatus includes a data acquirer configured to obtain a first partial image and a second partial image of an object based on data that is obtained respectively at a first angular section corresponding to a first time and at a second angular section corresponding to a second time during a tomography scan of the object that is moving, a controller configured to determine first information indicating a motion amount of the object in a first area of an entire image based on the first partial image and the second partial image, and determine second information indicating a degree of blur of a point included in the object in the first area based on the first information, and an image processor configured to correct the first area based on the first information and the second information, and output a tomography image based on the corrected first area.

18 Claims, 23 Drawing Sheets

(51) Int. Cl.
*G06T 7/20* (2017.01)
*G06T 5/00* (2006.01)

(58) Field of Classification Search
CPC . G06T 2207/10072; G06T 2207/10081; G06T 2207/10101; G06T 2207/10104; A61B 6/5258; A61B 6/5264
See application file for complete search history.

(56) References Cited

U.S. PATENT DOCUMENTS

| | | | |
|---|---|---|---|
| 7,249,886 | B1 | 7/2007 | Chao et al. |
| 8,462,214 | B2 | 6/2013 | Oh et al. |
| 8,938,112 | B2 | 1/2015 | Park et al. |
| 2007/0100226 | A1 | 5/2007 | Yankelevitz et al. |
| 2009/0154641 | A1* | 6/2009 | Thielemans .......... G01T 1/1647 378/21 |
| 2011/0142313 | A1 | 6/2011 | Pack et al. |
| 2011/0268334 | A1 | 11/2011 | Ra et al. |
| 2012/0275564 | A1 | 11/2012 | Hashimoto |
| 2012/0301001 | A1 | 11/2012 | Flohr et al. |
| 2012/0314922 | A1 | 12/2012 | Hsieh et al. |
| 2013/0182928 | A1* | 7/2013 | Park .................. G06T 7/0012 382/131 |
| 2014/0015936 | A1 | 1/2014 | Park et al. |
| 2014/0093134 | A1 | 4/2014 | Park et al. |
| 2014/0334702 | A1* | 11/2014 | El Fakhri ............ G06T 11/005 382/131 |
| 2014/0376795 | A1* | 12/2014 | Lamash .............. G06T 3/4053 382/131 |
| 2015/0063534 | A1* | 3/2015 | Allmendinger ........ A61B 6/032 378/19 |

FOREIGN PATENT DOCUMENTS

| | | |
|---|---|---|
| KR | 10-2010-0099558 A | 9/2010 |
| KR | 10-2011-0009936 A | 1/2011 |
| KR | 10-2013-0083205 A | 7/2013 |
| KR | 10-2014-0008226 A | 1/2014 |
| KR | 10-2014-0042461 A | 4/2014 |
| WO | 2004/001667 A2 | 12/2003 |

OTHER PUBLICATIONS

Schwarzband, et al., "The PSF of spiral CT", Physics in Medicine and Biology, Nov. 2, 2005, pp. 1-17.

Hofmann, et al., "Removing Blooming Artifacts With Binarized Deconvolution in Cardiac CT", Medical Imaging 2014, Proc. of SPIE vol. 9033 90330J, total 10 pages.

Communication dated Jul. 26, 2016 issued by the International Searching Authority in counterpart International Application No. PCT/KR2016/003526 (PCT/ISA/210/220).

Communication dated Mar. 15, 2018, issued by the European Patent Office in counterpart European application No. 16776822.5.

Ambwani, et al., "A Feasibility Study of Joint Respiratory and Cardiac Motion Correction for Coronary PET/CT Imaging", Jun. 28, 2009, BioMedical Imaging: From Nano to Macro, 4 pages total.

* cited by examiner

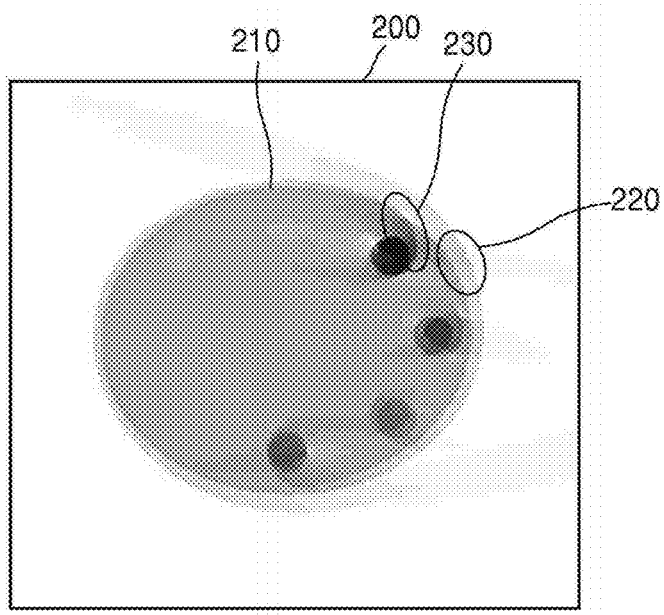

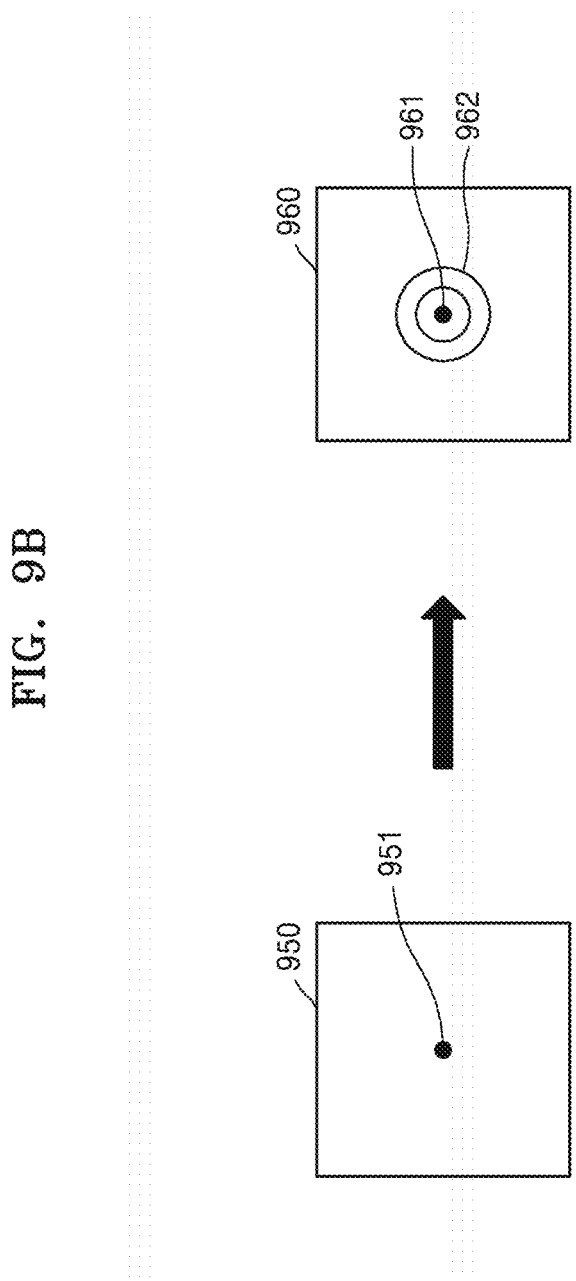

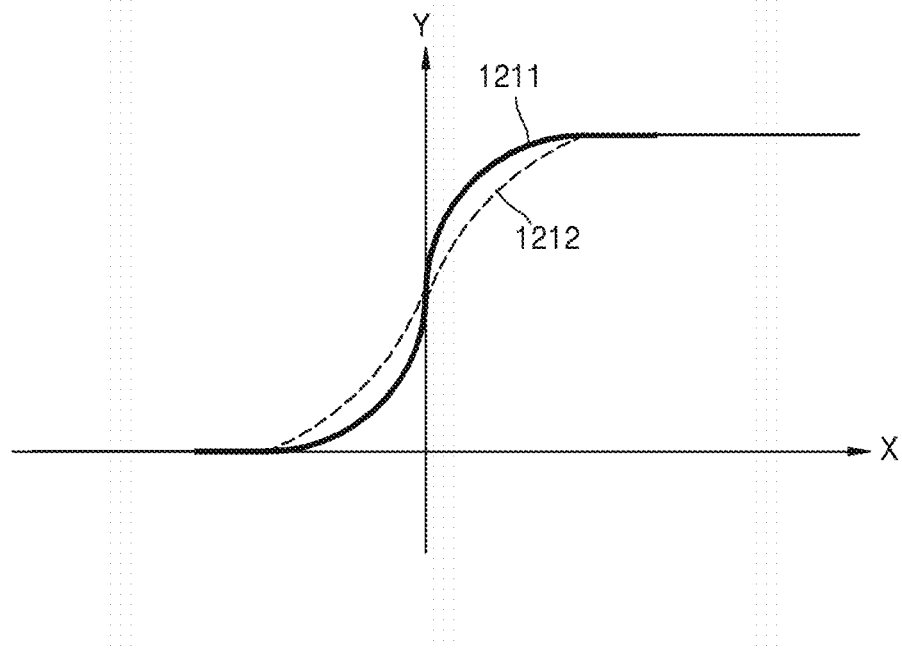

TOMOGRAPHY APPARATUS AND METHOD OF RECONSTRUCTING TOMOGRAPHY IMAGE BY USING THE TOMOGRAPHY APPARATUS

CROSS-REFERENCE TO RELATED APPLICATION

This application claims priority from Korean Patent Application No. 10-2015-0050238, filed on Apr. 9, 2015, in the Korean Intellectual Property Office, the disclosure of which is incorporated herein in its entirety by reference.

BACKGROUND

1. Field

Apparatuses and methods consistent with exemplary embodiments relate to a tomography apparatus and a method of reconstructing a tomography image by using the tomography apparatus.

2. Description of the Related Art

Medical imaging apparatuses are used to obtain an image of an internal structure of an object. Medical image apparatuses that are non-invasive testing apparatuses capture images and provide a processed image to a user including processed structural details, internal tissues, and the flow of fluids in a human body. The user, who is, for example, a medical doctor, may diagnose a health state and a disease of a patient by using a medical image output from a medical image processing apparatus.

A computed tomography (CT) apparatus is a typical apparatus among apparatuses for capturing an image of an object by projecting X-rays to a patient.

Among medical image processing apparatuses, the CT apparatus may provide a cross-sectional image of an object that may show an internal structure (e.g., organs such as kidneys and lungs) of the object without overlapping elements in the internal structure, compared to a general X-ray apparatus. Therefore, the tomography apparatus is widely used for accurate diagnosis of diseases. Hereinafter, a medical image obtained by the apparatus is referred to as a tomography image.

To obtain a tomography image, a tomography scan is performed on the object by using a tomography apparatus, and thus raw data is obtained. Then, the tomography image is reconstructed by using the obtained raw data. The raw data may be projection data, which is obtained by projecting X-rays to the object, or a sinogram that is a group of pieces of the projection data.

For example, to obtain a tomography image, the tomography image has to be reconstructed by using a sinogram that is obtained through a tomography scan. The reconstruction of the tomography image will be described in detail with reference to FIGS. 1A and 1B.

FIGS. 1A and 1B are diagrams for describing a CT scan and reconstruction operations.

FIG. 1A is a diagram for describing a CT scan of a tomography apparatus that performs a CT scan while rotating around an object 25, and obtains raw data corresponding to the object 25. FIG. 1B is a diagram for describing a sinogram obtained by the CT scan and a reconstructed CT image.

The tomography apparatus generates and projects X-rays to the object 25, and detects X-rays passing through the object 25 by using an X-ray detector. The X-ray detector generates raw data that corresponds to the detected X-rays.

Referring to FIG. 1A, an X-ray generator 20 included in the tomography apparatus projects X-rays to the object 25. During the CT scan that is performed by the tomography apparatus, the X-ray generator 20 rotates around the object 25 and obtains first to third raw data 30, 31, and 32 according to a rotation angle. The first, second and third raw data 30, 31, and 32 are obtained by detecting X-rays that are applied to the object 25 at a position P1, a position P2, and a position P3, respectively. The raw data may be projection data.

To generate one cross-sectional CT image, the X-ray generator 20 has to perform the CT scan while rotating at least 180°.

Referring to FIG. 1B, a sinogram 40 is obtained by combining the projection data 30, 31, and 32 that are obtained by moving the X-ray generator 20 at a predetermined angular interval, as described with reference to FIG. 1A. The sinogram 40 is obtained by the CT scan that is performed as the X-ray generator 20 rotates during one cycle. The sinogram 40, which corresponds to one cyclic rotation, may be used to generate one cross-sectional CT image. According to specifications of a CT system, one cyclic rotation may be about more than a half turn or one turn.

A CT image 50 is reconstructed by performing a filtered back-projection on the sinogram 40, and the sinogram 40 is reconstructed by performing a forward-projection on the CT image 50.

The reconstructed CT image 50 may include various types of artifacts. The artifacts in the CT image 50 may decrease the quality of the tomography image 50, and thus hinder the ability of the user, such as a medical doctor, to accurately read the CT image 50 and diagnose diseases.

FIG. 2 is a diagram for describing motion artifacts in a reconstructed CT image 200. FIG. 2 illustrates the CT image 200 that is obtained by using a full reconstruction method in which an image is reconstructed by using raw data that is obtained by rotating around an object 210 by 360° or more.

Referring to FIG. 2, when motion artifacts are generated in the reconstructed CT image 200, an outermost edge 220 of the object 210 is unclear and overlapping due to the motion artifacts. Also, an inner edge 230 of the reconstructed CT image 200 is blurred due to motions of the object 210.

As described above, motion artifacts and blur artifacts in a CT image may decrease the quality of the CT image, and thus hinder the ability of the user, such as a medical doctor, to accurately read the CT image and diagnose diseases. Therefore, there is a demand to reconstruct a CT image with minimum artifacts.

SUMMARY

Exemplary embodiments may address at least the above problems and/or disadvantages and other disadvantages not described above. Also, the exemplary embodiments are not required to overcome the disadvantages described above, and may not overcome any of the problems described above.

One or more exemplary embodiments provide a tomography apparatus that may reduce an occurrence of motion artifacts and blur artifacts in a reconstructed tomography image, and a method of reconstructing a tomography image by using the tomography apparatus.

According to an aspect of an exemplary embodiment, there is provided a tomography apparatus including a data acquirer configured to obtain a first partial image and a second partial image of an object based on data that is obtained respectively at a first angular section corresponding to a first time and at a second angular section corresponding to a second time during a tomography scan of the object that is moving. The tomography apparatus further includes a controller configured to determine first information indicating a motion amount of the object in a first area of an entire image based on the first partial image and the second partial image, and determine second information indicating a degree of blur of a point included in the object in the first area based on the first information. The tomography apparatus further includes an image processor configured to correct the first area based on the first information and the second information, and output a tomography image based on the corrected first area.

The second information may include a point spread function.

The controller may be further configured to determine whether the motion amount of the object is less than a threshold motion amount, determine an outline of the object in the first area in response to the controller determining that the motion amount of the object is less than the threshold motion amount, determine a first point spread function (PSF) based on the outline, and determine the second information based on the first PSF.

The controller may be further configured to determine a second PSF based on active sparse three-dimensional PSF sampling, determine a third PSF based on a PSF model of the tomography apparatus, and determine the second information based on the first PSF, the second PSF, and the third PSF.

The controller may be further configured to determine the second information by applying different weighted values to the first PSF, the second PSF, and the third PSF, respectively.

The controller may be further configured to determine whether the motion amount of the object is greater than or equal to a threshold motion amount, determine a third PSF based on a PSF model of the tomography apparatus in response to the controller determining that the motion amount of the object is greater than or equal to the threshold motion amount, and determine the second information based on the third PSF.

The image processor may be further configured to perform motion correction on the first area based on the first information, and de-blur the first area based on the second information.

The image processor may be further configured to determine whether the motion amount of the object is less than a threshold motion amount, perform motion correction on the first area based on the first information in response to the image processor determining that the motion amount of the object is greater than or equal to the threshold motion amount, and de-blur the first area based on the second information in response to the image processor determining that the motion amount of the object is less than the threshold motion amount.

The image processor may be further configured to de-blur the motion-corrected first area based on the second information.

The image processor may be further configured to determine whether a sharpness of the de-blurred first area is less than a threshold sharpness, modify the first information based on at least one selected from the sharpness of the de-blurred first area and the second information in response to the image processor determining that the sharpness of the de-blurred first area is less than the threshold sharpness, and perform motion correction on the first area based on the modified first information.

The image processor may be further configured to perform motion correction on the first area based on the first information, determine an outline of the object in the motion-corrected first area, determine a point spread function (PSF) based on the outline, determine a similarity between the PSF and the second information, determine whether the similarity is less than a threshold similarity, modify the first information based on the second information in response to the image processor determining that the similarity is less than the threshold similarity, perform the motion correction based on the modified first information, and de-blur the first area based on the second information in response to the image processor determining that the similarity is greater than or equal to the threshold similarity.

According to an aspect of another exemplary embodiment, there is provided an operation method of a tomography apparatus, the method including obtaining a first partial image and a second partial image of an object based on data that is respectively obtained at a first angular section corresponding to a first time and at a second angular section corresponding to a second time during a tomography scan of the object that is moving. The method further includes determining first information indicating a motion amount of the object in a first area of an entire image based on the first partial image and the second partial image, and determining second information indicating a degree of blur of a point included in the object in the first area based on the first information. The method further includes correcting the first area based on the first information and the second information, and outputting a tomography image based on the corrected first area.

The second information may include a point spread function.

The determining the second information may include determining whether the motion amount of the object is less than a threshold motion amount, determining an outline of the object in the first area in response to the determining that the motion amount of the object is less than the threshold motion amount, determining a first point spread function (PSF) based on the outline, and determining the second information based on the first PSF.

The determining the second information may further include determining a second PSF based on active sparse three-dimensional PSF sampling, determining a third PSF based on a PSF model of the tomography apparatus, and determining the second information based on the first PSF, the second PSF, and the third PSF.

The determining the second information may further include determining the second information by applying different weighted values to the first PSF, the second PSF, and the third PSF, respectively.

The determining the second information may further include determining whether the motion amount of the object is greater than or equal to a threshold motion amount, determining a third PSF based on a PSF model of the tomography apparatus in response to the determining that the motion amount of the object is greater than or equal to the threshold motion amount, and determining the second information based on the third PSF.

The correcting may include performing motion correction on the first area based on the first information, and de-blurring the first area based on the second information.

The correcting may include determining whether the motion amount of the object is less than a threshold motion amount, performing motion correction on the first area based on the first information in response to the determining that the motion amount of the object is greater than or equal to the threshold motion amount, and de-blurring the first area based on the second information in response to the determining that the motion amount of the object is less than the threshold motion amount.

A non-transitory computer-readable storage medium may store a program configured to be executed by a computer to perform the method.

BRIEF DESCRIPTION OF THE DRAWINGS

The above and/or other aspects will be more apparent by describing exemplary embodiments with reference to the accompanying drawings, in which:

FIG. 2 is a diagram for describing motion artifacts in a reconstructed CT image;

FIGS. 9A and 9B are diagrams for describing a point spread function (PSF);

FIG. 12 is a graph for describing an image processing operation of a tomography apparatus according to an exemplary embodiment;

DETAILED DESCRIPTION

Figure 1A:
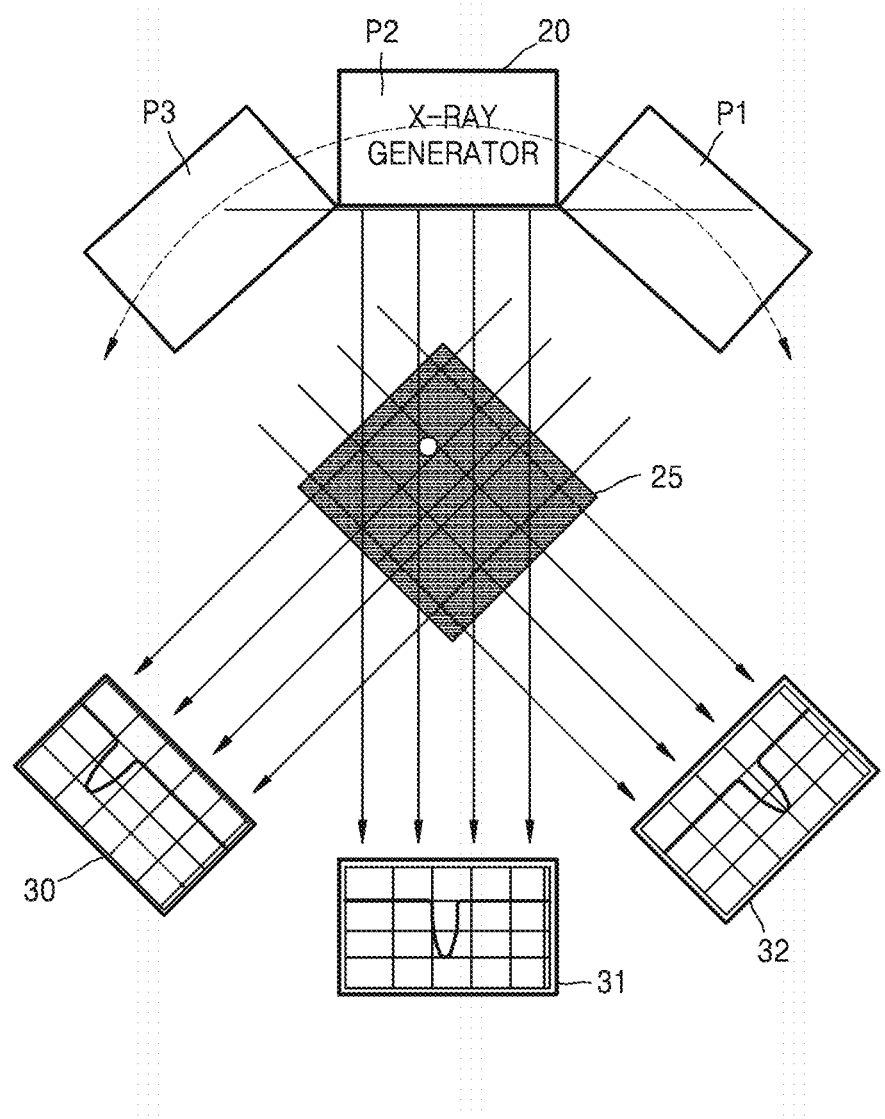
FIGS. 1A and 1B are diagrams for describing a computed tomography (CT) scan and reconstruction operations.

Exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions are not described in detail because they would obscure the description with unnecessary detail.

It will be understood that the terms "comprises" and/or "comprising" used herein specify the presence of stated features or components, but do not preclude the presence or addition of one or more other features or components. In addition, the terms such as "unit," "-er (-or)," and "module" described in the specification refer to an element for performing at least one function or operation, and may be implemented in hardware, software, or the combination of hardware and software.

As used herein, the term "and/or" includes any and all combinations of one or more of the associated listed items. Expressions such as "at least one of," when preceding a list of elements, modify the entire list of elements and do not modify the individual elements of the list.

Throughout the specification, an "image" may mean multi-dimensional data formed of discrete image elements, e.g., pixels in a two-dimensional (2D) image and voxels in a three-dimensional (3D) image. For example, the image may include a medical image of an object that is captured by a tomography apparatus.

Throughout the specification, a "tomography image" may mean an image obtained by performing a tomography scan on an object by using a tomography apparatus, that is, an image obtained by projecting a light beam such as an X-ray to an object and imaging by using projection data. Throughout the specification, a "tomography image" may mean an image generated by synthesizing a plurality of X-ray images that are obtained by capturing an image of an object while a tomography apparatus rotates around at least one axis with respect to the object.

Throughout the specification, examples of an "object" may include a human, an animal, or a part of a human or animal. For example, examples of the object may include at least one of organs such as liver, heart, womb, brain, breast, abdomen, etc., and blood vessels. Also, the object may include a phantom. The phantom means a material having a volume that is very close to a density and effective atomic number of an organism, and may include a sphere phantom having a characteristic similar to a physical body.

Throughout the specification, a "user" may be, but is not limited to, a medical expert including a doctor, a nurse, a medical laboratory technologist, a medial image expert, and a technician who repairs a medical apparatus.

Because a tomography system, such as a computed tomography (CT) system, is capable of providing a cross-sectional image of an object, the tomography system may express an inner structure (e.g., organs such as kidneys or lungs) of the object without an overlap therebetween, contrary to a general X-ray imaging apparatus.

In detail, a tomography system may include all tomography apparatuses such as a CT apparatus, an optical coherence tomography (OCT) apparatus, or a positron emission tomography (PET)-CT apparatus.

In the following description, a CT system is exemplified as the tomography system.

The CT system may obtain a plurality of pieces of image data with a thickness not more than 2 mm, several tens to several hundreds of times per second, and then may process the plurality of pieces of image data, so that the tomography system may provide a relatively accurate a cross-sectional image of the object. According to the related art, only a horizontal cross-sectional image of the object can be obtained, but this issue has been overcome due to various image reconstruction methods. Examples of 3D image reconstruction methods are as below:

- Shade surface display (SSD)—an initial 3D imaging method that displays only voxels having a predetermined Hounsfield Units (HU) value.
- Maximum intensity projection (MIP)/minimum intensity projection (MinIP)—a 3D imaging method that displays only voxels having the greatest or smallest HU value among voxels that construct an image.

Volume rendering (VR)—an imaging method capable of adjusting a color and transmittance of voxels that construct an image, according to regions of interest.

Virtual endoscopy—a method that allows an endoscopy observation in a 3D image that is reconstructed by using the VR method or the SSD method.

Multi-planar reformation (MPR)—a method used to reconstruct an image into a different cross-sectional image. A user may reconstruct an image in every desired direction.

Editing—a method that involves editing adjacent voxels to allow a user to easily observe a region of interest in volume rendering.

Voxel of interest (VOI)—a method that displays only a selected area in volume rendering.

A CT system 100 according to an exemplary embodiment will now be described with reference to FIG. 3. The CT system 100 may include various types of devices.

Figure 3:
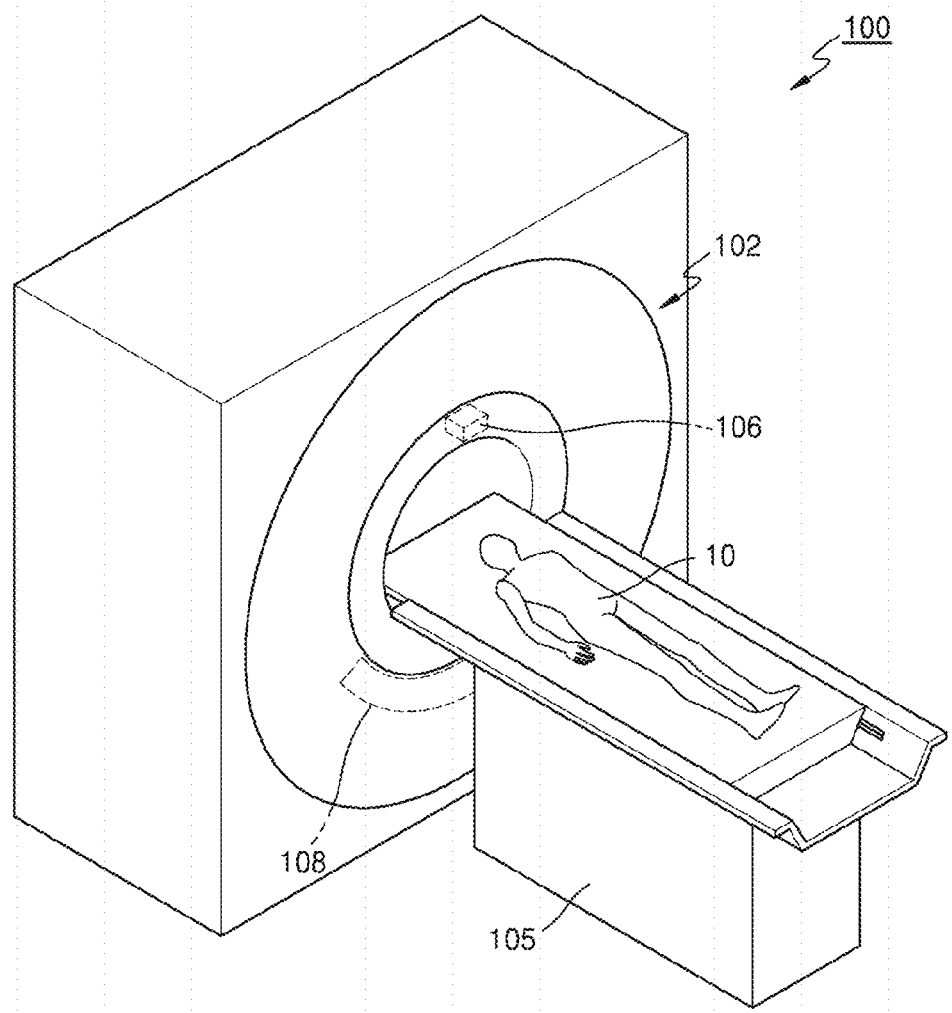
FIG. 3 is a schematic diagram of a CT system according to an exemplary embodiment.

FIG. 3 is a schematic diagram of the CT system 100 according to an exemplary embodiment. Referring to FIG. 3, the CT system 100 includes a gantry 102, a table 105, an X-ray generator 106, and an X-ray detector 108.

The gantry 102 may include the X-ray generator 106 and the X-ray detector 108.

An object 10 may be positioned on the table 105.

The table 105 may move in a predetermined direction, for example, at least one of up, down, right, and left directions, during a CT scan process. Also, the table 105 may tilt or rotate by a predetermined degree in a predetermined direction.

The gantry 102 may also tilt by a predetermined degree in a predetermined direction.

Figure 4:
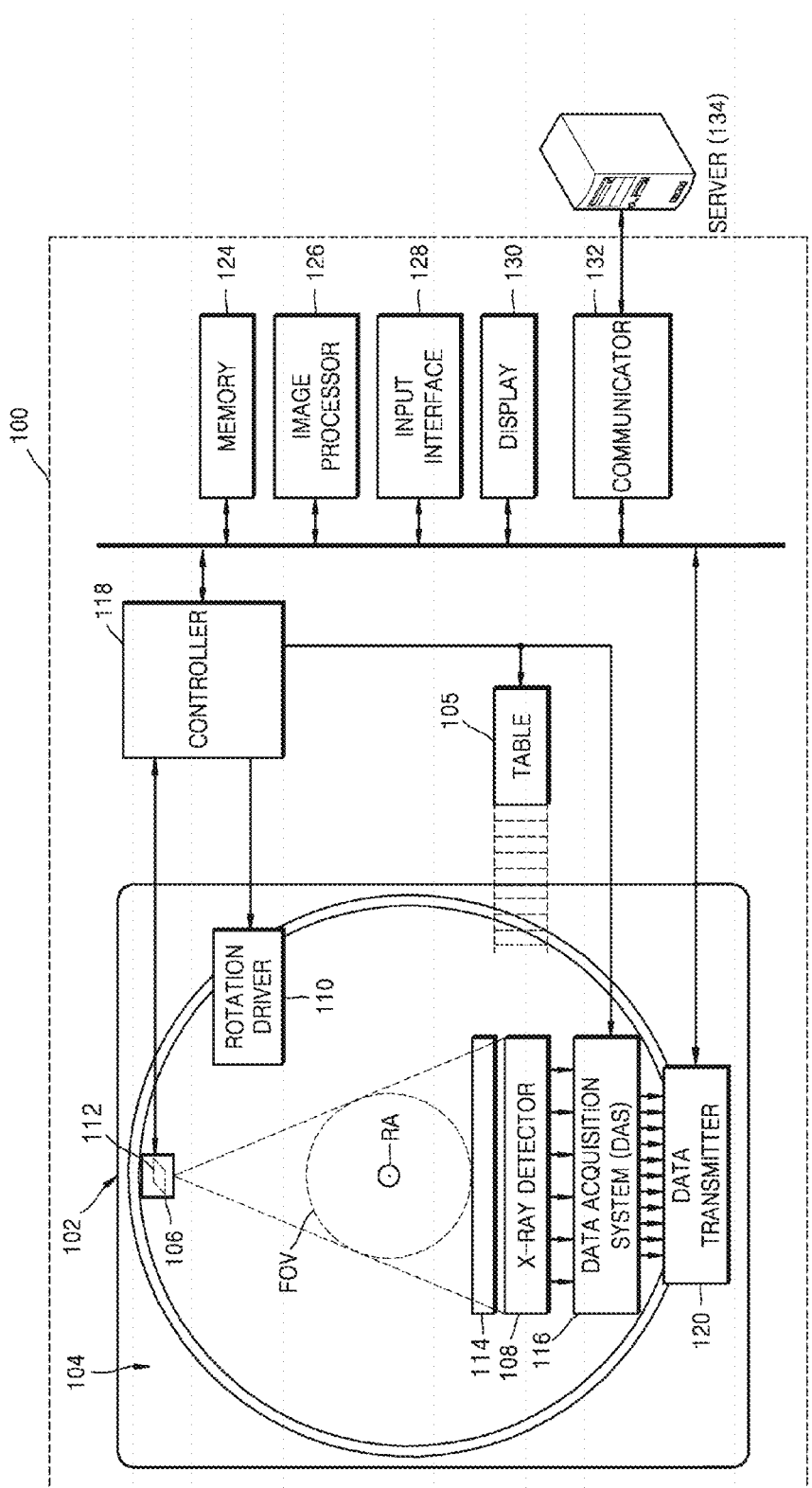
FIG. 4 is a block diagram of the CT system of FIG. 3.

FIG. 4 is a block diagram of the CT system 100 of FIG. 3.

The CT system 100 includes the gantry 102, the table 105, a controller 118, a memory 124, an image processor 126, an input interface 128, a display 130, and a communicator 132.

As described above, the object 10 may be positioned on the table 105. In an exemplary embodiment, the table 105 may move in a predetermined direction, for example, at least one of up, down, right, and left directions, and motion of the table 105 may be controlled by the controller 118.

The gantry 102 includes a rotating frame 104, the X-ray generator 106, the X-ray detector 108, a rotation driver 110, a data acquisition system (DAS) 116, and a data transmitter 120.

The gantry 102 may include the rotating frame 104 having a loop shape capable of rotating with respect to a predetermined rotation axis RA. Also, the rotating frame 104 may have a disc shape.

The rotating frame 104 includes the X-ray generator 106 and the X-ray detector 108 that are arranged to face each other to have predetermined field of views (FOV). The rotating frame 104 also includes an anti-scatter grid 114. The anti-scatter grid 114 is positioned between the X-ray generator 106 and the X-ray detector 108.

Although FIG. 4 illustrates that the rotating frame 104 includes one X-ray generator 106, the rotating frame 104 may include a plurality of X-ray generators. Also, when the rotating frame 104 includes a plurality of X-ray generators, the rotating frame 104 includes a plurality of X-ray detectors corresponding to the plurality of X-ray generators. In detail, one X-ray generator 106 is one X-ray source. For example, when the rotating frame 104 includes two X-ray generators 106, it may be said that the rotating frame 104 includes a dual source. In the following description, when the rotating frame 104 includes one X-ray generator 106, the one X-ray generator 106 included in the rotating frame 104 is referred to as a single source. Also, when the rotating frame 104 includes two X-ray generators, the two X-ray generators included in the rotating frame 104 is referred to as a dual source. In the two X-ray generators forming a dual source, one X-ray generator is referred to as a first source and the other X-ray generator is referred to as a second source. Also, the CT system 100 in which the X-ray generator 106 is included in the rotating frame 104 is referred to as a single source tomography apparatus and, when two X-ray generators are included in the rotating frame 104 may be referred to as a dual source tomography apparatus.

In a medical imaging system, X-ray radiation that reaches a detector (or a photosensitive film) includes not only attenuated primary radiation that forms a valuable image but also scattered radiation that deteriorates the quality of an image. To transmit most of the primary radiation and to attenuate the scattered radiation, the anti-scatter grid 114 may be positioned between a patient and the detector (or the photosensitive film).

For example, the anti-scatter grid 114 may be formed by alternately stacking lead foil strips and an interspace material such as a solid polymer material, solid polymer, or a fiber composite material. However, formation of the anti-scatter grid 114 is not limited thereto.

The rotating frame 104 may receive a driving signal from the rotation driver 110 and may rotate the X-ray generator 106 and the X-ray detector 108 at a predetermined rotation speed. The rotating frame 104 may receive the driving signal and power from the rotation driver 110 while the rotating frame 104 contacts the rotation driver 110 via a slip ring. Also, the rotating frame 104 may receive the driving signal and power from the rotation driver 110 via wireless communication.

The X-ray generator 106 may receive a voltage and current from a power distribution unit (PDU) via a slip ring and a high voltage generator, and then may generate and project X-rays. When the high voltage generator applies predetermined voltage (hereinafter, referred to as the tube voltage) to the X-ray generator 106, the X-ray generator 106 may generate X-rays having a plurality of energy spectra that correspond to the tube voltage.

The X-rays generated by the X-ray generator 106 may be emitted in a predetermined form due to a collimator 112.

The X-ray detector 108 is positioned to face the X-ray generator 106. The X-ray detector 108 may include a plurality of X-ray detectors. Each of the plurality of X-ray detectors may establish one channel, but one or more exemplary embodiments are not limited thereto.

The X-ray detector 108 may detect the X-ray that is generated by the X-ray generator 106 and that is transmitted through the object 10, and may generate an electrical signal corresponding to intensity of the detected X-ray.

The X-ray detector 108 may include an indirect-type X-ray detector for detecting radiation after converting the radiation into light, and a direct-type X-ray detector for detecting radiation after directly converting the radiation into electric charges. The indirect-type X-ray detector may use a scintillator. Also, the direct-type X-ray detector may use a photon counting detector. The DAS 116 is connected to the X-ray detector 108. The electrical signal generated by the X-ray detector 108 may be wired or wirelessly collected by the DAS 116. Also, the electrical signal generated by the X-ray detector 108 may be provided to an analog-to-digital converter via an amplifier.

According to a slice thickness or the number of slices, only part of data collected by the X-ray detector 108 may be provided to the image processor 126 via the data transmitter 120, or the image processor 126 may select only part of data.

The digital signal may be provided to the image processor 126 via the data transmitter 120. The digital signal may be wired or wirelessly provided to the image processor 126.

The controller 118 may control an operation of each of modules in the CT system 100. For example, the controller 118 may control operations of the table 105, the rotation driver 110, the collimator 112, the DAS 116, the memory 124, the image processor 126, the input interface 128, the display 130, the communicator 132, etc.

The image processor 126 may receive data, for example, pure data before processing, which is obtained from the DAS 116, via the data transmitter 120, and may perform pre-processing.

The pre-processing may include a process of correcting sensitivity irregularity between channels and a process of correcting a signal loss due to a rapid decrease of signal strength or due to an X-ray absorbing material such as metal, etc.

Data output from the image processor 126 may be referred to as raw data or projection data. The projection data may be stored in the memory 124 with imaging conditions, for example, the tube voltage, an imaging angle, etc., during the acquisition of data.

The projection data may be a group of data values that correspond to the intensity of the X-ray that passes through the object 10. For convenience of description, it is assumed that a group of a plurality of pieces of projection data that are simultaneously obtained from all channels at the same imaging degree is referred to as a projection data set.

The memory 124 may include at least one storage medium among a flash memory-type storage medium, a hard disk-type storage medium, a multimedia card micro-type storage medium, card-type memories such as an SD card, an XD memory, etc., random access memory (RAM), static random access memory (SRAM), read-only memory (ROM), electrically erasable programmable ROM (EEPROM), programmable ROM (PROM), magnetic memory, a magnetic disc, and an optical disc.

The image processor 126 may reconstruct a cross-sectional image with respect to the object 10 by using the obtained projection data set. The cross-sectional image may be a 3D image. In other words, the image processor 126 may reconstruct a 3D image of the object 10 by using a cone beam reconstruction method etc., based on the obtained projection data set.

The input interface 128 may receive an external input with respect to an X-ray tomography imaging condition, an image processing condition, etc. For example, the X-ray tomography imaging condition may include tube voltages, energy value setting with respect to a plurality of X-ray beams, selection of an imaging protocol, selection of an image reconstruction method, setting of a FOV area, the number of slices, a slice thickness, parameter setting with respect to image post-processing, etc. Also, the image processing condition may include a resolution of an image, attenuation coefficient setting with respect to the image, setting of an image combining ratio, etc.

The input interface 128 may include a device for receiving a predetermined input from an external source. For example, the input interface 128 may include a microphone, a keyboard, a mouse, a joystick, a touchpad, a touch pen, a voice recognition device, a gesture recognition device, etc.

The display 130 may display an X-ray image reconstructed by the image processor 126.

Exchanges of data, power, etc. between the aforementioned elements may be performed by using at least one of wired communication, wireless communication, and optical communication.

The communicator 132 may perform communication with an external device, an external medical apparatus, etc. via a server 134, etc. The communication will now be described with reference to FIG. 5.

Figure 5:
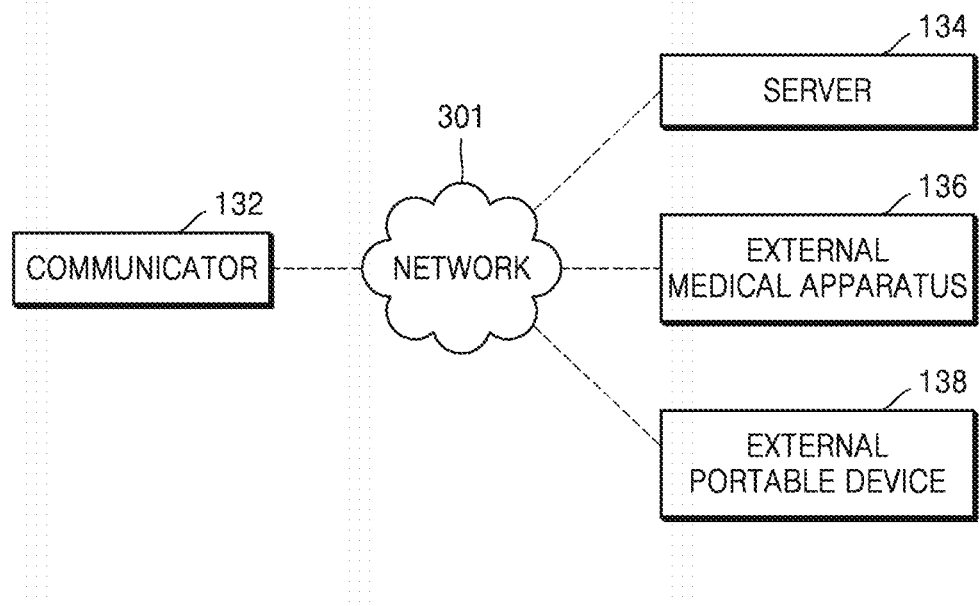
FIG. 5 is a block diagram of a communicator of FIG. 4.

FIG. 5 is a block diagram of the communicator 132 of FIG. 4.

The communicator 132 may be wired or wirelessly connected to a network 301 and therefore may perform communication with the server 134, an external medical apparatus 136, or an external portable device 138. The communicator 132 may exchange data with a hospital server or other medical apparatuses in a hospital connected via a picture archiving and communication system (PACS).

Also, the communicator 132 may perform data communication with an external device, etc., according to a digital imaging and communications in medicine (DICOM) standard.

The communicator 132 may transmit and receive data related to diagnosing the object 10, via the network 301. Also, the communicator 132 may transmit and receive a medical image obtained from the external medical apparatus 136 such as a magnetic resonance imaging (MRI) apparatus, an X-ray apparatus, etc.

Furthermore, the communicator 132 may receive a diagnosis history or a medical treatment schedule about a patient from the server 134, and may use the diagnosis history or the medical treatment schedule in a clinical diagnosis for the patient. Also, the communicator 132 may perform data communication not only with the server 134 or the external medical apparatus 136 in a hospital but also with the external portable device 138 of a user or patient.

Also, the communicator 132 may transmit information about a device error, information about a quality control status, etc. to a system manager or a service manager via the network 301, and may receive a feedback corresponding to the information.

In tomography scanning, the X-ray generator 106 may reconstruct one cross-sectional tomography image by using raw data that is obtained as the X-ray generator 106 rotates a half turn, or more or less than one turn. It takes about 0.2 seconds or more to obtain the raw data for reconstructing a cross-sectional tomography image. Accordingly, if an object moves within 0.2 seconds, motion artifacts are generated in a reconstructed image. Amount of motion artifacts varies according to a time used to obtain raw data for reconstructing the tomography image, and a resolution of the tomography image may change due to the amount of motion artifacts. The resolution of the tomography image with respect to time is referred to as 'temporal resolution.'

All imaging apparatuses have a spatial resolution that indicates an accuracy of an image formed by capturing an object in a space. Due to unique characteristics of the imaging apparatuses, the imaging apparatuses cannot obtain perfect images of an object at a captured time point without blur. That is, the spatial resolution is determined according to a degree of blur in a processed image. For example, an image captured by an imaging apparatus with a high spatial resolution is less blurry than that captured by an imaging apparatus with a low spatial resolution.

The tomography apparatus also has a spatial resolution. Due to a limitation in the spatial resolution, blur artifacts are generated. For example, due to the limitation in the spatial resolution of the tomography apparatus, an object in a tomography image may have unclear edges. The blur artifacts may be reduced by estimating a point spread function (PSF) and de-blurring based on the PSF. The PSF has a complicated structure, and may vary according to a location of an image and a tube current measured in milliamperes for generating X-rays. Correction of the blur artifacts may be referred to as de-blurring or de-blooming.

The motion artifacts and the blur artifacts in a tomography image may decrease the quality of the tomography image and thus hinder the ability of the user, such as a medical doctor, to accurately read the tomography image and diagnose diseases.

When performing a tomography scan on a moving object, the tomography apparatus according to an exemplary embodiment reconstructs a tomography image by organically considering motion artifacts and blur artifacts. Hereinafter, an apparatus and method of removing the motion artifacts and the blur artifacts according to exemplary embodiments will be described with reference to FIG. 6.

Figure 6:
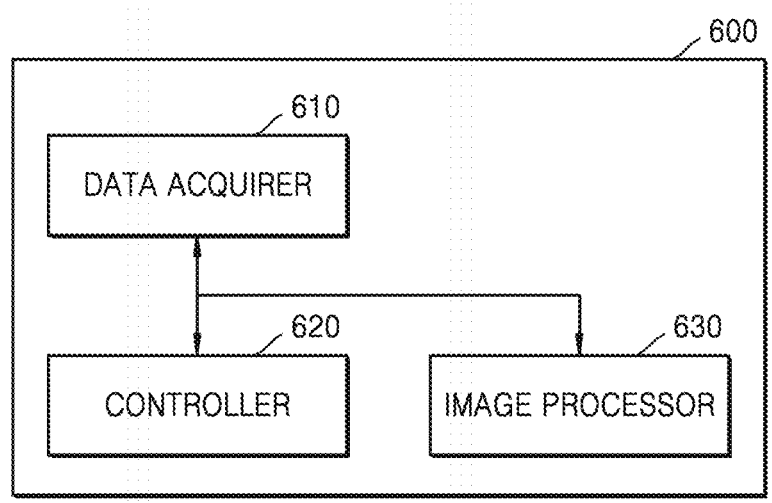
FIG. 6 is a block diagram of a tomography apparatus according to an exemplary embodiment.

FIG. 6 is a block diagram of a tomography apparatus 600 according to an exemplary embodiment.

Referring to FIG. 6, the tomography apparatus 600 according to an exemplary embodiment includes a data acquirer 610, a controller 620, and an image processor 630.

Figure 1B:
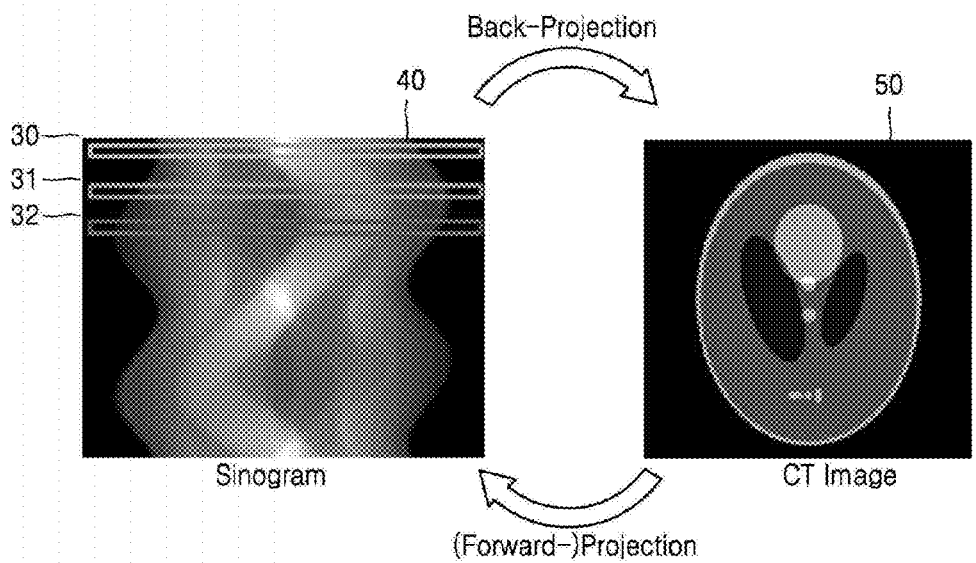

The tomography apparatus 600 may be included in the CT system 100 that is described with reference to FIGS. 3 and 4. Also, the tomography apparatus 600 may be included in the external medical apparatus 136 or the external portable device 138, shown in FIG. 5, and may operate by being connected to the CT system 100. The tomography apparatus 600 may be any medical imaging apparatus that reconstructs images by using data obtained by using a light beam passing through an object. In other words, the tomography apparatus 600 may be any medical imaging apparatus that reconstructs images by using projection data that is obtained by using a light beam passing through an object. For example, the tomography apparatus 600 may be any medical apparatus that may obtain, process, and/or display medical images by using X-rays passing through an object. The tomography apparatus 600 may be a CT apparatus, an OCT apparatus, or a PET-CT apparatus. Accordingly, a tomography image obtained by the tomography apparatus 600 may be a CT image, an OCT image, or a PET image. In the drawings referred to by the following descriptions, a CT image is exemplified as the tomography image. Alternatively, the tomography apparatus 600 may be an MRI apparatus. Also, when the tomography apparatus 600 is included in the CT system 100 of FIG. 1, the data acquirer 610, the controller 620, and the image processor 630 shown in FIG. 6 may be included in the image processor 126 of FIG. 4.

The data acquirer 610 obtains a first image and a second image by using pieces of data that are respectively obtained at a first angular section corresponding to a first time and a second angular section corresponding to a second time by performing a tomography scan on a moving object. An object may include a predetermined organ. For example, the object may include at least one selected from the heart, abdomen, womb, brain, breast, and liver. The object may include the heart that is expressed by a surface. The heart may include at least one tissue having different brightness values in a predetermined area.

Also, the data acquirer 610 may obtain raw data by performing a tomography scan as the X-ray generator 106 rotates once, or more or less than once, around the object. The raw data may be a projection data that is obtained by projecting radiation to the object, or a sinogram that is a group of the projection data. Alternatively, the raw data may be an image that is generated by performing filtered back-projection on the projection data or the sinogram. When the X-ray generator 106 at a predetermined position projects X-rays to the object, a viewpoint or a direction in which the X-ray generator 106 faces the object is referred to as a 'view.' The projection data is raw data that is obtained with respect to a view, and the sinogram is raw data that is obtained by sequentially listing a plurality of pieces of projection data.

With regard to a reconstruction of a tomography image, reconstructing a tomography image by using raw data that is obtained as the X-ray generator 106 rotates a half turn or more and less than one turn is referred to a half reconstruction method, and reconstructing a tomography image by using raw data that is obtained as the X-ray generator 106 rotates one turn is referred to as a full reconstruction method. Also, reconstructing a tomography image by using raw data that is obtained as the X-ray generator 106 rotates less than half turn is referred to as a partial angle reconstruction (PAR) method. A tomography image that is reconstructed by using the half reconstruction method or the full reconstruction method is a complete image that shows the entire object, but a tomography image that is reconstructed by using the PAR method is an incomplete image that shows only a part of the object. An incomplete image that is reconstructed by using the half reconstruction image may be referred to as a 'partial image' or a 'partial angle image.'

According to the exemplary embodiments, an image of an object may be obtained by using the half reconstruction method or the full reconstruction method so that a tomography image is obtained.

The data acquirer 610 may obtain a first image by using raw data that is obtained at a first angular section that corresponds to a first time, and a second image by using raw data that is obtained at a second angular section that corresponds to a second time. The terms 'first angular section' and 'second angular section' refer to a 'partial angular section' that is less than one turn and included in a one-cycle angular section. The first angular section and the second angular section may have a value less than 180°. Also, the first image and the second image are partial images.

The first image and the second image may be images that are captured at different times. Because the first image and the second image are images that are reconstructed by using only raw data that is obtained at partial angular sections, the first and second images are not complete images that show the entire object, but incomplete images that show only a part of the object. Incomplete images that partially show an object like the first and second images may be referred to as a 'partial image' or a 'partial angle image.'

The first angular section and the second angular section may be angular sections for imaging identical or similar surfaces of an object to estimate a motion amount of the object. For example, the first and second angular section may be partial angular sections that are adjacent to each other. Alternatively, the first and second angular sections may be partial angular sections that face each other.

As the time for obtaining raw data used to reconstruct one cross-sectional tomography image decreases, a temporal resolution may be increased. Accordingly, when the first and second images reconstructed by using the PAR method, the temporal resolution of the first and second images may be increased. Also, the motion amount of the object may be more accurately estimated by comparing the first and second images of which the temporal resolution is increased.

By using the first and second images, the controller 620 may obtain first information that shows the motion amount of the object in a first area in the entire image, and obtain second information that shows a degree of blur of at least one point included in the object of the entire image or is included in the object in the first area in the entire image based on the first information. For example, the first information may be information that shows a degree of blur of at least one point in a surface that forms the object.

Also, the controller 620 may be the same as or correspond to the controller 118 of FIG. 4. The controller 620 may be provided as independent hardware, but is not limited thereto. The controller 620 may be included in the data acquirer 610 or the image processor 630.

The controller 620 may divide the entire image into a plurality of areas. Then, the controller 620 may obtain first information that shows a motion amount of an object in a first area from the plurality of areas.

When the X-ray generator 106 emits a cone beam while rotating around a moving object, the data acquirer 610 may obtain raw data corresponding to the cone beam and may convert the obtained raw data to raw data that corresponds to a parallel beam by rearranging the obtained raw data. Also, the controller 620 may obtain first information by using the raw data that corresponds to the parallel beam. The converting of the cone beam to the parallel beam is referred to as 'rebinning.' The first information may be obtained by using raw data that corresponds to the rebinned parallel beam. Alternatively, the controller 620 may obtain the first information by using the raw data that corresponds to the cone beam.

The controller 620 may obtain information of motions of an object by using first and second images. The controller 620 may obtain first information of a motion amount of the object between a first time and a second time. The motion amount may be a difference between at least one selected from shapes, sizes, and locations of the object in the first image and the object in the second image. The difference may be caused by the motions of the object. As described above, the tomography apparatus 600 may divide the entire image into a plurality of areas, and the controller 620 may obtain first information with respect to each of the plurality of areas.

The first information is information that shows a motion amount of an object according to time. The first information may be about a motion of a surface that forms the object at a time. For example, the object may move while the tomography apparatus 600 is capturing the object, and due to the motions of the object, motion artifacts may be generated in an image of the object. The motion artifacts are defects in an image that are generated due to motions of an object. According to the exemplary embodiments, motions of an object may be estimated, and motion artifacts may be corrected by using the estimated motions of the object. The first information will be described in detail later with reference to FIGS. 8A and 8B.

Based on the first information, the controller 620 may obtain second information that shows a degree of blur of at least one point included in an object in a first area. The second information may include a PSF. The PSF will be described in detail with reference to FIGS. 9 and 10.

Also, the controller 620 may compare a motion amount of the object in the first information and a threshold motion amount. The motion amount may be obtained based on vectors that indicate motions of the object. The vectors that indicate the motions may have sizes and directions. Comparing motion amounts may refer to comparing sizes of the vectors that indicate the motions of the object. Also, the motion amount may be indicated by using a vector field that includes a plurality of vectors. For example, comparing motion amounts may refer to comparing average sizes of the plurality of vectors or comparing sizes of representative vectors among the plurality of vectors. The motion amount will be described in detail with reference to FIGS. 8A and 8B.

The controller 620 may compare a motion amount of an object in a first area with a threshold motion amount. The threshold motion amount is a value that is a basis for determining whether the motion amount of the object is large or small. For example, the threshold motion amount may be a value that is statistically appropriate with regard to a user-demanded image quality. The tomography apparatus 600 may be storing the threshold motion amount. For example, the tomography apparatus 600 may be storing the threshold motion amount of the memory 124 of FIG. 4. The tomography apparatus 600 may receive the threshold motion amount from the communicator 132. Alternatively, the tomography apparatus 600 may receive the threshold motion amount from the user. The tomography apparatus 600 may show changes in an image according to changes in the threshold motion amount. The user may easily determine the threshold motion amount while checking the threshold motion amount. The threshold motion amount may be determined as different values depending on a body part or a type of organ that is captured.

The controller 620 may extract a first area in which the motion amount of the object is less than the threshold motion amount, and obtain a boundary line of the object in the extracted first area. Also, the controller 620 may extract a first PSF based on the boundary line. The controller 620 may obtain the boundary line in the first area by using at least one selected from a Sobel mask, a Prewitt mask, a Robert mask, and a Canny mask.

The controller 620 may estimate the first PSF of the first area based on the boundary line of the object in the first area. Also, the controller 620 may obtain second information of the first area based on the first PSF.

Blur artifacts may be generated due to a limitation in a spatial resolution of the tomography apparatus 600. The second information may be information about the blur artifacts. Here, 'blurring' may have the same meaning as 'blooming.'

The controller 620 may estimate the first PSF based on blur in the obtained boundary line. Because the obtained boundary line is a boundary line in the first area that is obtained when the motion amount of the object is less than the threshold motion amount, the obtained boundary line may have practically no motion artifacts. Accordingly, the controller 620 may obtain the first PSF based on the boundary line in the first area, and the first PSF may indicate blur artifacts in the first area.

The controller 620 may estimate a second PSF based on active sparse 3D PSF sampling. The active sparse 3D PSF sampling is a method of estimating a PSF based on a phantom or a table that corresponds to an object to be captured. The phantom may have, but is not limited to, linear or spherical shapes. The tomography apparatus 600 may know boundary information of the table or the phantom in advance. Accordingly, the tomography apparatus 600 may estimate the second PSF based on the table shown in an image or an image of the phantom.

The controller 620 may estimate a third PSF based on a PSF model of the tomography apparatus 600. All imaging apparatuses, such as the tomography apparatus 600, have limited spatial resolutions. A PSF model of the tomography apparatus 600 may be provided by a manufacturer of the tomography apparatus 600. Then, the third PSF may be estimated based on the PSF model of the tomography apparatus 600.

The controller 620 may obtain the second information based on the first to third PSFs as described above. The controller 620 may obtain the second information by applying different weighting values to the first to third PSFs. The first to third PSFs may have different importance. The controller 620 may allocate a high weighting value to a PSF. The tomography apparatus 600 may be storing importance information. The tomography apparatus 600 may receive the importance information from a user or a communicator.

The tomography apparatus 600 may divide the entire image into a plurality of areas. The tomography apparatus 600 may estimate a PSF for each of the plurality of areas. A final PSF value of the plurality of areas may be obtained by a weighted average sum of the first to third PSFs. For example, the final PSF value may be obtained as in [Equation 1], wherein w0, w1, and w2 may be weighted values.

Final PSF=($w$0×first PSF)+($w$1×second PSF)+($w$2× third PSF)  [Equation 1]

The final PSF may be included in the second information. The controller 620 may compare the motion amount of the object in the first area to the threshold motion amount. Also, when the motion amount of the object is greater than or equal to the threshold motion amount, the controller 620 may estimate the third PSF based on the PSF model of the tomography apparatus 600. Also, the controller 620 may obtain the second information about the first area, based on the third PSF. When the motion amount is greater than or equal to the threshold motion amount, the tomography apparatus 600 may detect that the object in the first area of the image has a large motion. The tomography apparatus 600 may detect that motion artifacts and blur artifacts are both generated in the first area. For example, the motion amount of the object in the first area may be greater than or equal to the threshold motion amount. Also, based on the threshold motion amount, the controller 620 may determine whether a first area is an area in which the motion artifacts significantly dominates the blur artifacts. In a first area in which the motion artifacts dominate the blur artifacts, it may be difficult to estimate a PSF based on the boundary line of the object. Therefore, the controller 620 may obtain second information of the first area based on the third PSF that is estimated based on the PSF model of the tomography apparatus 600. That is, when the motion amount of the first area is greater than or equal to the threshold motion amount, w0 and w1 of [Equation 1] is set to zero and w2 is set to a non-zero value so that only the third PSF is reflected when obtaining the second information.

As described above, the tomography apparatus 600 may obtain the second information based on the first information of the first area. The tomography apparatus 600 may obtain the second information by using different methods according to the motion amount of the first area. Also, based on first information of each of the plurality of areas in the entire image, the tomography apparatus 600 may obtain second information that is for each area. Therefore, the tomography apparatus 600 may obtain a clear image that is based on the second information.

The image processor 630 performs image correction on the first area based on the first and second information, and output a fully reconstructed tomography image. The image processor 630 may correspond to the image processor 126 of FIG. 4, but is not limited thereto. The image processor 630 may perform operations as described below. Also, at least some of the operations of the image processor 630 may be performed in parallel to operations of the controller 620.

The image processor 630 may correct the motion artifacts of the object with respect to time in the first area, based on the first and second information. Also, the image processor 630 may correct blur artifacts that are generated in the first area. Correcting the blur artifacts may be referred to as de-blurring or de-blooming. Correcting the blur artifacts will be described with reference to FIGS. 10A, 10B, and 10C.

When the fully reconstructed tomography image is generated in the image processor 630, the fully reconstructed tomography image may be displayed via the display 130 of FIG. 4. The memory 124 of FIG. 4 may store the fully reconstructed tomography image that is output from the image processor 630. Also, the tomography apparatus 600 may output the fully reconstructed tomography image via the communicator 132 of FIG. 4.

As described above, because the controller 620 compares the motion amount of the object in the first area with the threshold motion amount, the image processor 630 may receive a result of the comparison that is performed by the controller 620. When the motion amount of the object is greater than or equal to the threshold motion amount, the image processor 630 may perform image correction on the first area based on the first information. Also, the image processor 630 may de-blur the first area based on the second information.

Alternatively, the controller 620 may not compare the motion amount of the object in the first area with the threshold motion amount, but the image processor 630 may compare the motion amount of the object in the first area with the threshold motion amount. Then, the image processor 630 may correct motions and de-blur the first area according to a result of the comparison.

The image processor 630 may compare the motion amount of the object in the first area with the threshold motion amount. Then, when the motion amount of the object in the first area is less than the threshold motion amount, the image processor 630 may de-blur the first area based on the second information.

Also, the image processor 630 may compare sharpness of the de-blurred first area with threshold sharpness. When the sharpness of the de-blurred first area is less than the threshold sharpness, the image processor 630 may correct first information based on at least one of the sharpness of the de-blurred first area and the second information. The image processor 630 may perform motion correction based on the corrected first information.

The image processor 630 may obtain a boundary line of a motion-correction first area. The image processor 630 may obtain a fourth PSF based on the obtained boundary line. Also, the image processor 630 may determine similarity between the fourth PSF and the second information. When the similarity between the fourth PSF and the second information is less than a threshold similarity, the image processor 630 may correct the first information based on the second information. Then, the image processor 630 may correct motions based on the corrected first information. Correcting of the first information will be described in detail with reference to FIGS. 12 to 16.

Operations of the image processor 630 will be described more in detail with reference to FIGS. 13 to 16. Operations of the tomography apparatus 600 will be described in detail with reference to FIG. 7.

Figure 7:
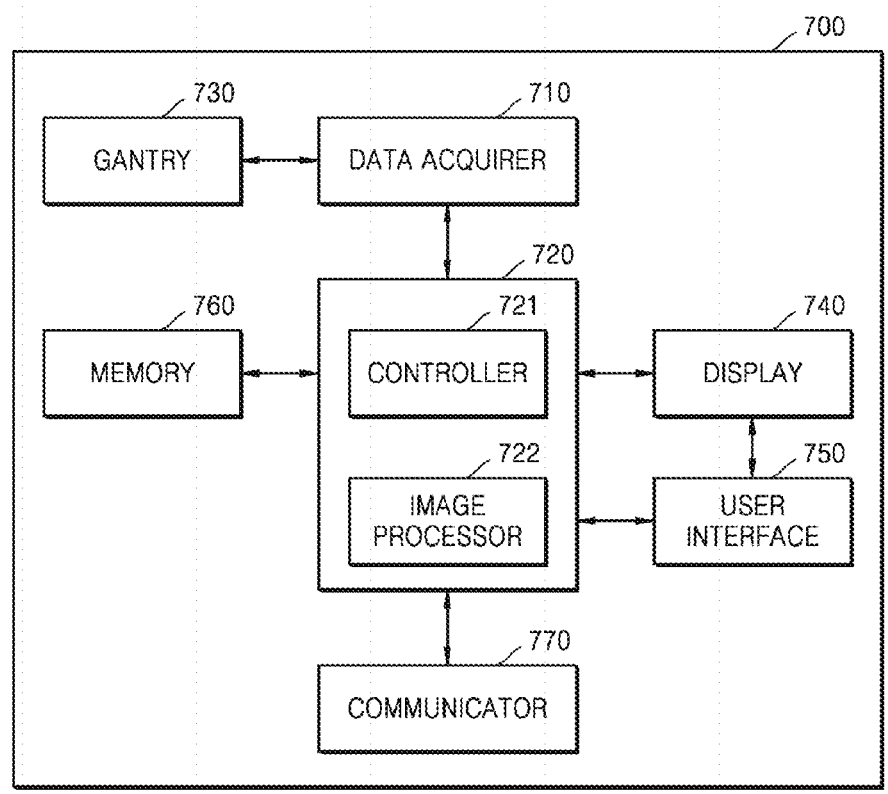
FIG. 7 is a block diagram of a tomography apparatus according to another exemplary embodiment.

FIG. 7 is a block diagram of a tomography apparatus 700 according to another exemplary embodiment. In FIG. 7, the tomography apparatus 700 includes a data acquirer 710, a controller 721, and an image processor 722, which are the same as or correspond to the data acquirer 610, the controller 620, and the image processor 630 of FIG. 6, respectively, and thus, they will not be repeatedly described.

The tomography apparatus 700 may include the controller 721 and the image processor 722 as single hardware, i.e., an image reconstructor 720, but is not limited thereto. The tomography apparatus 700 may include the controller 721 and the image processor 722 as separate hardware, as shown in FIG. 6.

Also, the tomography apparatus 700 includes a gantry 730, a display 740, a user interface 750, a memory 760, and a communicator 770. Because the gantry 730, the display 740, the user interface 750, the memory 760, and the communicator 770 in the tomography apparatus 700 are the same as the gantry 102, the display 130, the input interface 128, the memory 124, and the communicator 132 in the CT system 100 shown in FIG. 4, they will not be repeatedly described.

The data acquirer 710 may obtain a first image that corresponds to a first time and a second image that corresponds to a second time by performing a tomography scan on an object.

Also, based on motion amounts of the first and second images, the image reconstructor 720 may obtain first information that indicates a relationship between a motion amount of the object and time. The first and second images may be images that are reconstructed according to a PAR method. Because the first and second images are reconstructed by using raw data that is obtained in an angular section, the first and second images are not complete images that fully show object, but are incomplete images that partially show the object. Incomplete images that partially show an object like the first and second images may be referred to as a 'partial image' or a 'partial angle image.'

Also, the first time corresponds to a time point when raw data that is obtained to reconstruct the first image, and the second time corresponds to a time point when raw data that is obtained to reconstruct the second image. For example, when raw data is obtained during a time interval from 0 to 'a' to reconstruct the first image, the first time may be a/2, which is in the middle of the time interval from 0 to a. Also, when the raw data is obtained during a time interval from b to c to reconstruct the second image, the second time may be (c+b)/2, which is in the middle of the time interval from b to c.

Also, the first image indicates the object at the first time, and the second image indicates the object at the second time.

Based on the first information and the second information, the image reconstructor 720 reconstructs a target image that shows the object at a target time point. The image reconstructor 720 reconstructs the target image by performing motion correction and de-blurring on the object based on the first information and the second information. The image reconstructor 720 may correct motions of the object by warping an image showing the object, an image grid for imaging the object, or voxels that indicate the object.

'Warping' refers to adjusting an object in an image according to a state of an expected object by changing the state of the object in the image, for example, expanding, contracting, moving, and/or resizing.

The image reconstructor 720 may obtain the second information based on the first information. Also, the image reconstructor 720 may perform de-blurring based on the second information. A method of obtaining the second information and a method of de-blurring based on the second information will be described with reference to FIGS. 10A, 10B, and 10C. Also, image reconstruction operations of the image reconstructor 720 will be described in detail with reference to FIGS. 11 to 16.

The gantry 730 includes the X-ray generator 106 of FIG. 4, the X-ray detector 108 of FIG. 4, and the DAS 116 of FIG. 4. The gantry 730 projects X-rays to the object, detects X-rays that penetrated through the object, and generates raw data that corresponds to the detected X-rays.

The X-ray generator 106 generates X-rays. The X-ray generator 106 rotates around the object and projects X-rays to the object. Then, the X-ray detector 108 detects X-rays that penetrated through the object. The DAS 116 generates raw data that corresponds to the detected X-rays.

A tomography image that is reconstructed by using the half reconstruction method may have less motion artifacts than a tomography image that is obtained by using the full reconstruction method. That is, when time for obtaining raw data that is used to reconstruct a cross-sectional tomography image is reduced, an image with less motion artifacts may be reconstructed. In other words, as the time for obtaining the raw data that is used to reconstruct a cross-sectional tomography image decreases, a temporal resolution may increase, and thus, a patient may be less exposed to radiation. According to the exemplary embodiments, the tomography apparatus and the tomography image reconstruction method of the tomography apparatus may use the full reconstruction method or the half reconstruction method as described above.

The display 740 displays a predetermined screen. For example, the display 740 may display a user interface screen for performing a tomography scan or a fully reconstructed tomography image.

The user interface 750 may generate and output a user interface screen for receiving a command or data from the user, and receive the command or the data via the user interface screen. The user interface screen that is output from the user interface 750 is displayed by the display 740. The user may recognize information or input a command or data via the user interface screen that is displayed on the display 740.

The user interface 750 may include, for example, a mouse, a keyboard, or any other input device with hard keys for inputting predetermined data. The user may input a predetermined command or data by using at least one selected from the mouse, the keyboard, and any other input device included in the user interface 750.

Alternatively, the user interface 750 may be formed as a touchpad. The user interface 750 may include a touchpad that is coupled to a display panel in the display 740, and output a user interface screen to the display panel. When a command is input via the user interface screen, the touchpad may be detect the input and recognize the command that is input.

When the user interface 750 is formed as a touchpad, when the user touches a point on the user interface screen, the user interface 750 detects the touched point and transmits detected information to the image reconstructor 720. Then, the image reconstructor 720 may recognize a request or a command of the user that corresponds to a menu shown at the touched point, and perform a tomography image reconstruction operation in response to the recognized request or command.

The memory 760 may store data that is obtained by tomography scanning. For example, the memory 760 may store projection data, sinogram, or both. The projection data and the sinogram are raw data. Also, the memory 760 may store data or programs that are used to reconstruct a tomography image, and store a fully reconstructed tomography image. The memory 760 may store data that is used for obtaining at least one of the first information and the second information. The memory 760 may store at least one of the obtained first information and second information.

The communicator 770 may perform communication with an external device or an external medical device. For example, the communicator 770 may be connected to an external tomography system or an external tomography apparatus and receive first and second images. Alternatively, the communicator 770 may receive raw data for reconstructing the first and second images. In this case, the data acquirer 710 may receive the first and second images or the raw data for reconstructing the first and second images via the communicator 770, and obtain the first information based on the received raw data.

The tomography apparatuses 600 and 700 according to the exemplary embodiments may reconstruct tomography images by using at least one selected from the PAR method, the full reconstruction method, and the half reconstruction method. Also, the tomography apparatuses 600 and 700 may obtain the first and second images in various scan modes. Also, the tomography apparatuses 600 and 700 may perform a tomography scan by using an axial scanning method and a helical scanning method. Also, the X-ray generator 106, which generates light sources with various projection forms, may be used in the tomography apparatuses 600 and 700.

When the object is a moving object, such as the heart, raw data has to be obtained after reducing time or an angle corresponding to one cycle so that less motion artifacts are in a reconstructed tomography image. Because the half reconstruction method may reduce motion artifacts than the full reconstruction method, an example of using the half reconstruction method to reconstruct a target image is described hereinafter.

Figure 8A:
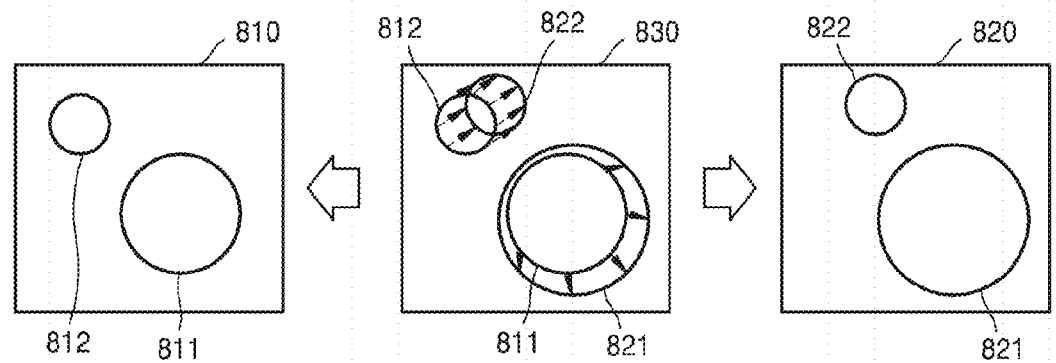
FIGS. 8A to 8B are diagrams for describing first information.
Figure 8B:
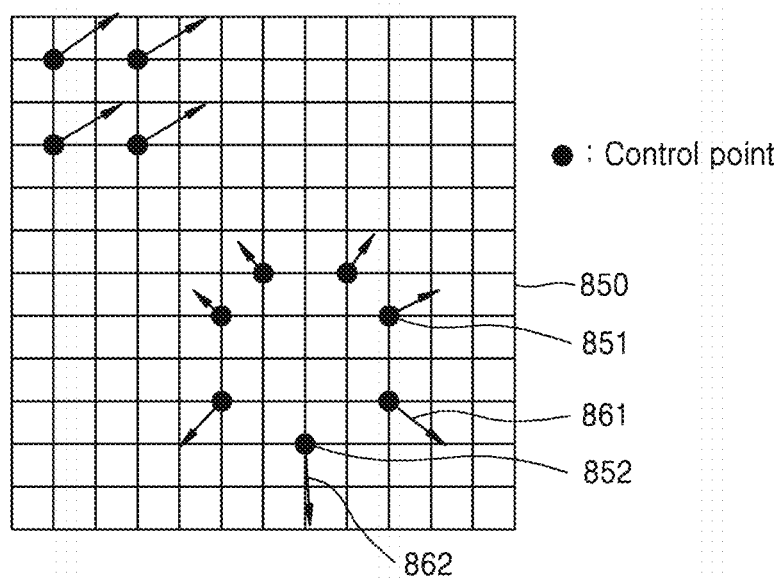

FIGS. 8A and 8B are diagrams for describing first information. FIG. 8A is a diagram for comparing a first image 810 and a second image 820. FIG. 8B is a diagram of motion amounts of the first image 810 and the second image 820.

Referring to FIG. 8A, for convenience of description, the first image 810 and the second image 820 are assumed as complete images.

The first image 810 and the second image 820 are tomography images generated by capturing a moving object. In FIG. 8A, objects 811, 812, 821, and 822 in the first image 810 and the second image 820, respectively, are circular-shaped. To compare motion amounts of the objects 811, 812, 821, and 822, the object 811 and 822 in the first image 810 are compared with the objects 821 and 822 in the second image 820. According to a comparison result, the motion amounts of the objects 811, 812, 821, and 822 may be estimated as shown in a comparison image 830.

Referring to FIG. 8B, surfaces that indicate identical portions of the objects 811, 812, 821, and 822 in the first and second images 810 and 820 are compared with each other to thus estimate a motion vector that indicates positional difference values and directions between the compared surfaces. The motion vector may be used as a motion amount of an object. Information that includes motion vectors and indicates a motion amount of a predetermined portion of an object may be a motion vector field (MVF). That is, the MVF indicates a motion amount of a surface that forms an object.

The MVF is information obtained to extract motions of an object. A motion amount of the object may be estimated by using non-rigid registration. Alternatively, the motion amount of the object may be estimated by using various motion estimation techniques such as rigid registration, an optical flow technique, and a feature matching technique.

Hereinafter, an example of using the non-rigid registration to obtain the MVF is described.

A plurality of control points (e.g., control points 851 and 852) are set in an image grid 850 of the first image 810 or the second image 820, and an optimal motion vector (e.g., motion vectors 861 and 862) is calculated at each control point. The motion vector is a vector that includes directions and sizes of motions. Motion vectors at the control points are interpolated to obtain an MVF that indicates motion vectors in all voxels. For example, a B-spline free form deformation method may be used to interpolate the motion vectors. Also, an optimization technique may be used to calculate an optimal motion vector at each control point. According to the optimization technique, the MVF is updated by repeatedly updating motion vectors at the control points, the first image 810 or the second image 820 is warped based on the updated MVF, and a warped first image or a warped second image is compared with the first image 810 or the second image 820, both of which have not been warped. When a degree of similarity between an image before warping and a warped image and is the highest, the repetition is finished and a motion vector is estimated. The degree of similarity may be indicated by using a negative sum of squared difference of brightness values of two images that are to be compared.

Alternatively, motion vectors may be obtained by setting control points on a surface of an object in the first and second images 810 and 820 and comparing control points that indicate identical points in the object. A relative difference between the control points is obtained by matching the control points. The relative difference may be used as a motion vector at a current control point. An MVF that indicates motion vectors at all voxels is obtained by interpolating the motion vectors at the control points. As described above, the B-spline free form deformation method may be used to interpolate the motion vectors.

The first information may be shown by using a graph that indicates a motion pattern of an object. The graph that indicates the motion pattern of the object may vary according to the object. For example, if the object is the heart, a graph that corresponds to the first information may reflect a motion pattern of the heart. Alternatively, if the object is a coronary artery in the heart, a graph that corresponds to the first information may reflect a motion pattern of the coronary artery. Even when the object is the coronary artery in the heart, a motion pattern may vary according to a position of the coronary artery in the heart. Accordingly, the graph of the first information may be different according to positions of the coronary artery. Alternatively, if the object is a mitral valve (MV) in the art, a graph of the first information may reflect a motion pattern of the MV.

A motion pattern may vary according to areas of an object to be tomography scanned. In this case, the tomography apparatus 600 may obtain the first information such that each area in an entire image reflects different motion patterns. A first area may include at least one of the areas.

A target image that indicates the entire object may be reconstructed by obtaining first information of each area and performing motion correction on each area by using the first information of each area. For example, if the object is the heart, a motion pattern may be different in the left ventricle, the right ventricle, the left atrium, and the right atrium. In this case, first information is separately obtained from the left ventricle, the right ventricle, the left atrium, and the right atrium, motion correction is performed on respective partial images of the left ventricle, the right ventricle, the left atrium, and the right atrium, and motion-corrected partial images of the left ventricle, the right ventricle, the left atrium, and the right atrium are synthesized to reconstruct a target image that indicates the heart. In the first information, a relationship between the motion amount and time may be set by the user.

When the controller 721 obtains the first information, a state of the object at a time point between first and second time may be estimated based on the first information. The image processor 722 may set a time point between the first and second time as a target time, and reconstruct a target image that indicates the object at the target time. The image processor 722 may reconstruct the target image by estimating status of the object at the target time point based on the first information, warping an image or the object according to the estimated status of the object, and performing motion correction on the object.

Figure 9A:
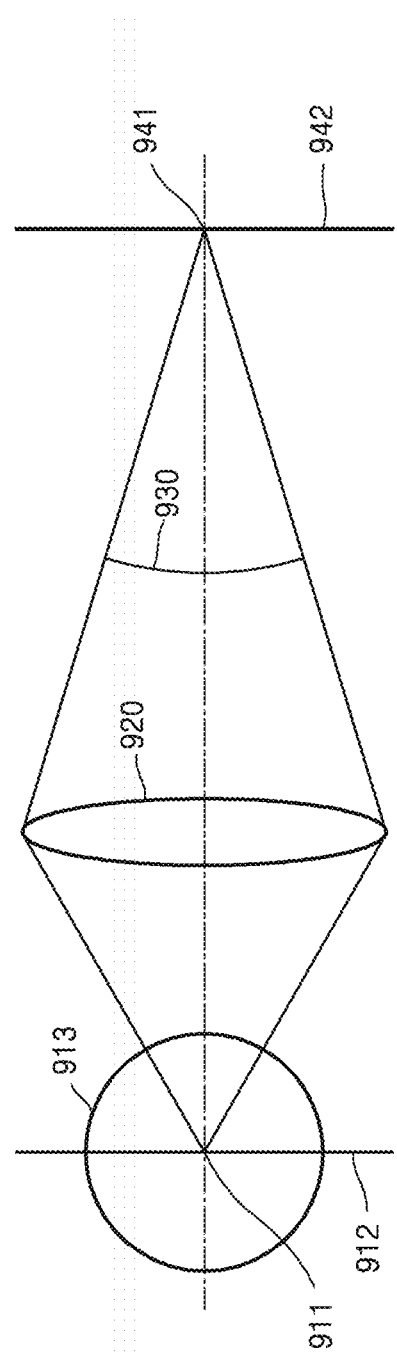

FIGS. 9A and 9B are diagrams for describing a PSF.

The PSF indicates a response of an imaging system to a point. That is, the PSF may be an impulse response in a space of the imaging system. The PSF may be approximately calculated by using a Gaussian function. Referring to FIG. 9A, a wave for generating an image of a point 911 on a plane 912 (shown as a line for convenience) of an object is shown. For example, the wave may be emitted from the point 911 in a form of a sphere 913. In an ultrasound system, the wave may be an ultrasound wave. In an optical instrument such as a microscope, the wave may be light. In a tomography apparatus or an X-ray imaging apparatus, the wave may be X-rays. An imaging system 920 may obtain a portion 930 of the wave in the form of the sphere 913. Also, the imaging system 920 may display the image of the point 911 on the plane 912 at a point 941 on an image plane 942.

Referring to FIG. 9B, an image of a point 951 on a plane 950 of an object may be displayed on an image plane 960. For example, an image may be displayed at a point 961 on the image plane 960, and an artifact 962 may be displayed on the image plane 960. The artifact 962 may be a blur artifact having a circular shape.

Figure 10A:
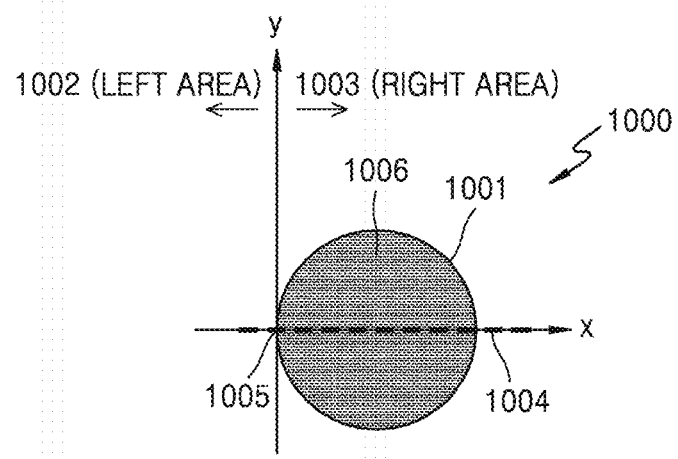
FIGS. 10A, 10B and 10C are other diagrams for describing a PSF.
Figure 10B:
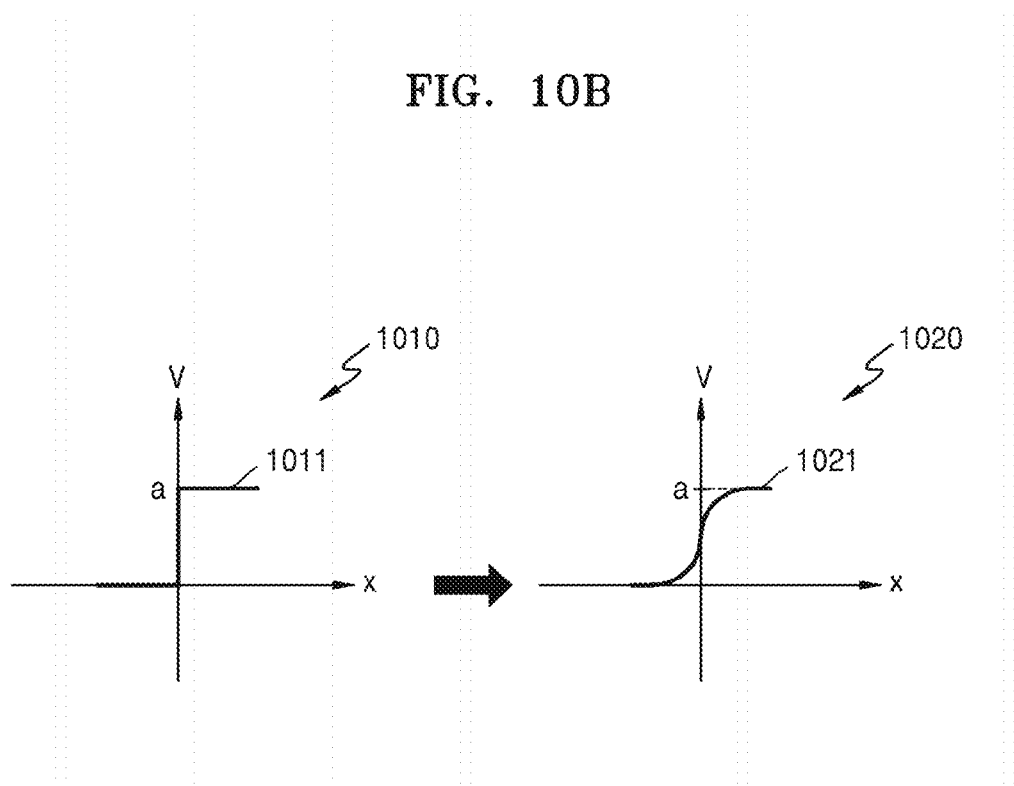
Figure 10C:
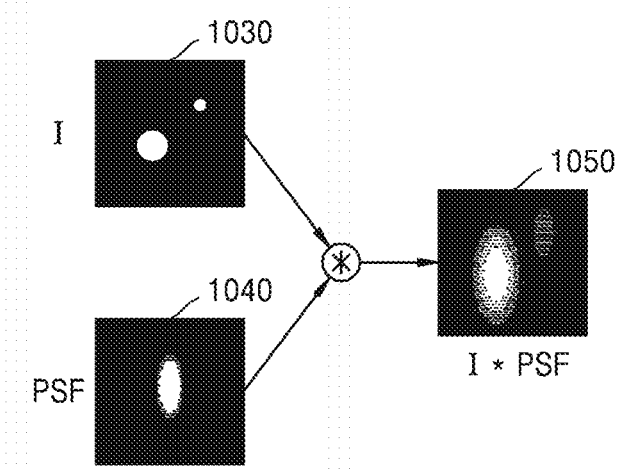

FIGS. 10A, 10B and 10C are other diagrams for describing a PSF.

FIG. 10A is an image 1000 of an object 1006 on a plane. Orthogonal axes may be arbitrarily set in the image 1000. For example, an x-axis may be set across the object 1006 and a y-axis may be adjacent to the object 1006.

In FIG. 10B, an x-axis indicates locations of points, and a v-axis indicates pixel values of points. A graph 1010 of FIG. 10B shows pixel values of a 1-dimensional (1D) line 1004 in the image 1000 of FIG. 10A when blurs have not occurred in the image 1000. Referring back to FIG. 10A, based on an origin 1001 of the image 1000, a pixel value of a left area 1002 is zero and a pixel value of a right area 1003 is 'a.' In the graph 1010 of FIG. 10B, the left area 1002 corresponds to negative values on the x-axis and the right area 1003 corresponds to positive values on the x-axis. Also, referring back to FIG. 10A, an origin corresponds to a point 1005 on a surface 1001. In the example described above, a pixel value is 0 when the values on the x-axis are negative, and the pixel value is 'a' when the values on the x-axis are positive. That is, the image 1000 may have a clear outline when the value on the x-axis is 0.

A graph 1020 of FIG. 10B is formed by modifying the graph 1010 by using a predetermined PSF. The predetermined PSF may be a PSF in a tomography apparatus. In comparison to the graph 1010, due to the PSF of the tomography apparatus, pixel values gradually change at a portion of the graph 1020 where values of an x-axis are 0. Therefore, the tomography apparatus may not be able to obtain an outline of an image modified by using a predetermined PSF.

FIG. 10C shows 2D images. An image 1030 (I) shows objects in a 2D space. The image 1030 does not have blur artifacts. An image 1040 (PSF) shows a PSF of the tomography apparatus 600. An object in the image 1040 is blurry and vertically long. When the tomography apparatus 600 captures the object, the PSF is applied, and thus an image 1050 (I*PSF) is obtained. That is, the tomography apparatus 600 obtains the image 1050 with blur artifacts by convoluting the image 1030 and the image 1040. For example, the object in the image 1040 that shows the PSF is blurry and vertically long. When the PSF is applied to the image 1030 including two circular objects, the image 1050 including two blurry and vertically long circles is obtained. The tomography apparatus 600 may obtain the image 1050 and the image 1030, and thus obtain the PSF in the tomography apparatus 600. As described above, the image 1030 shows an object, and the image 1050 may be obtained by capturing phantom using a tomography apparatus.

The tomography apparatus 600 may calculate an inverse PSF based on the obtained PSF. The tomography apparatus 600 may convolute the inverse PSF with the image 1050 including blur artifacts, and thus estimate the image 1030 without the blur artifacts. That is, the tomography apparatus 600 may perform a de-blurring operation based on the PSF.

The PSF may be estimated by using various methods. For example, the tomography apparatus 600 may be storing information about an original form of an outline of an object. However, exemplary embodiments are not limited thereto. The tomography apparatus 600 may receive information about an original form of an outline of an object from a communicator. The information about the original form of the outline of the object may indicate that pixel values suddenly change where the value on the x-axis is 0, as shown in the graph 1010. Also, the tomography apparatus 600 may obtain a full image of an object. From the full image, the tomography apparatus 600 may obtain a first area in which a motion amount of the object is not large. The tomography apparatus 600 may obtain information about an outline of the object that is captured in the first area. For example, the information about the outline of the captured object may indicate that pixel values gradually change where the value on the x-axis is 0. The tomography apparatus 600 may estimate a PSF based on the information about the outline of the captured object and the information about the original form of the outline. That is, the tomography apparatus 600 may estimate the PSF by convoluting an inverse image of the image 1030, which is the information about the original form of the outline, and the information about the outline of the captured object. The PSF that is estimated based on the captured object may be a first PSF.

Also, the PSF may be estimated based on active sparse 3D sampling. Referring to FIG. 10B, the tomography apparatus 600 may be storing the image 1030 that is related to a table or a phantom or a table of which an outline is known. Alternatively, the tomography apparatus 600 may actually capture the table or the phantom to obtain the image 1050.

The tomography apparatus 600 may estimate the PSF, for example, the second PSF, based on the graph 1010 and the graph 1020.

Figure 11A:
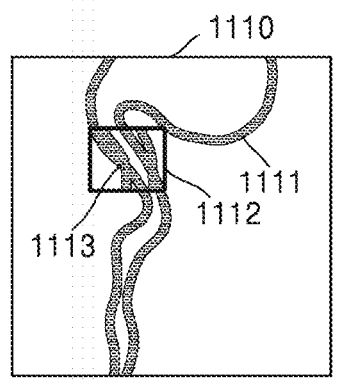
FIGS. 11A, 11B, and 11C are diagrams for describing an image processing operation of a tomography apparatus according to an exemplary embodiment.
Figure 11B:
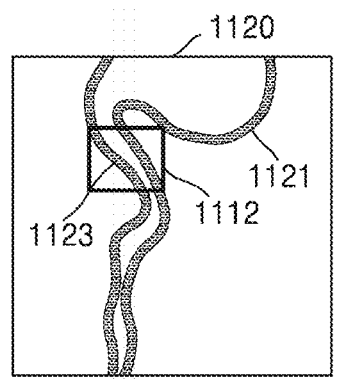
Figure 11C:
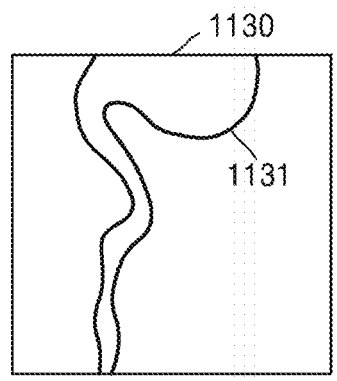

FIGS. 11A, 11B, and 11C are diagrams for describing an image processing operation of the tomography apparatus 600 according to an exemplary embodiment.

Referring to FIG. 11A, an image 1110 that is captured by the tomography apparatus 600 may be including both motion artifacts and blur artifacts. For example, in an area 1112, an outline 1113 of an object may be not clear and overlapped due to motions of the object. The outline 1113 of the object may refer to an outermost edge of the object. That is, the motion artifacts may be in the area 1112. The tomography apparatus 600 may determine that a motion amount of the object in the area 1112 is greater than or equal to greater than or equal to a threshold motion amount. Also, due to a limitation in a spatial resolution of the tomography apparatus 600, an outline 1111 may be not clearly displayed. That is, blur artifacts may include the outline 1111.

Referring to FIG. 11B, the tomography apparatus 600 may remove the motion artifacts in the area 1112, in which the motion amount of the object is greater than or equal to the threshold motion amount, based on first information. In the area 1112 of an image 1120, the motion artifacts are removed from an outline 1123 of the object. The motion artifacts may be removed by warping.

Also, referring to FIG. 11C, the tomography apparatus 600 may remove the blur artifacts after removing the motion artifacts. An operation of removing the blur artifacts, performed by the tomography apparatus 600, may be referred to as 'de-blurring.' The tomography apparatus 600 may remove the blur artifacts from an image by using a PSF. For example, an image 1130 may be obtained by convoluting an estimated inverse PSF to the image 1120, as described with reference to FIGS. 10A, 10B, and 10C. An outline 1131 of the object in the image 1130 is clearer than an outline 1121 of the object in the image 1120.

FIG. 12 is a graph for describing an image processing operation of the tomography apparatus 600 according to an exemplary embodiment.

FIG. 12 shows a graph of a PSF. An x-axis indicates locations of 1D points, and a v-axis indicates pixel values of the 1D points.

The tomography apparatus 600 may obtain an outline of an object in a first area after performing a motion correction. Also, the tomography apparatus 600 may estimate a fourth PSF based on the outline of the object. The estimated fourth PSF may be shown as a line 1212. Also, a final PSF included in second information may be shown as a line 1211.

Because the tomography apparatus 600 performs a de-blurring operation based on the final PSF included in the second information, when there is a high correlation between the fourth PSF and the final PSF, the tomography apparatus 600 may obtain a clearer image. Therefore, the tomography apparatus 600 may modify first information by using a method described below so that the fourth PSF has a high correlation with the final PSF.

The tomography apparatus 600 may modify the first information by using a gradient descent search method. For example, the tomography apparatus 600 may modify a motion amount in the first information. Also, the tomography apparatus 600 may perform a motion correction based on the modified first information. After performing the motion correction, the tomography apparatus 600 may obtain an outline of an object in a first area to estimate the fourth PSF. Also, the tomography apparatus 600 may calculate a difference between the fourth PSF and the final PSF.

A function of the difference between the fourth PSF and the final PSF may be indicated as f(mf, psf_in), wherein 'mf' refers to a motion amount, and 'psf_in' refers to the final PSF. That is, the function f(mf, psf_in) of the difference between the fourth PSF and the final PSF has the motion amount (mf) and the final PSF (psf_in) as variables. The tomography apparatus 600 may calculate a gradient of the function f(mf, psf_in). The tomography apparatus 600 may modify the motion amount (mf) in an opposite direction of the gradient by a predetermined amount. The tomography apparatus 600 may perform a motion correction based on the modified motion amount. The tomography apparatus 600 may repeat the process above until the function f(mf, psf_in) has a minimum value. The tomography apparatus 600 may obtain a motion amount at which the function f(mf, psf_in) has the minimum value as the modified first information. When the function f(mf, psf_in) has the minimum value, the line 1212 of the fourth PSF is the most similar to the line 1211 of the final PSF. To reduce computation load, the tomography apparatus 600 may modify the first information such that only an area where a motion amount is greater than a predetermined motion amount is modified.

The method of modifying the first information is not limited to the description above. The tomography apparatus 600 may arbitrarily modify a size and a direction of the motion amount by small extent. For example, the tomography apparatus 600 may add or subtract a predetermined vector to or from vectors in an MVF that indicates the motion amount of the object. Based on the modified motion amount, the tomography apparatus 600 may modify the first information such that the function f(mf, psf_in) has the minimum value.

Also, the tomography apparatus 600 may compare the final PSF and the fourth PSF in the second information. For example, the tomography apparatus 600 may determine a similarity between the final PSF and the fourth PSF. The tomography apparatus 600 may use statistics, for example, correlation, to determine the similarity. The similarity may be represented by a function g(mf, psf_in). The tomography apparatus 600 may modify the first information by using a gradient ascent search method. That is, the tomography apparatus 600 may calculate a motion amount (mf) at which the function g(mf, psf_in) has a maximum value, and may set the motion amount (mf), at which the function g(mf, psf_in) has the maximum value, as the first information. When the function g(mf, psf_in) has the maximum value, the line 1212 of the fourth PSF is the most similar to the line 1211 of the final PSF.

FIGS. 13 to 16 are flowcharts of an operation method of the tomography apparatus 600. Hereinafter, the operation method of the tomography apparatus 600 is described with reference to FIG. 13. Components and features that have been described with reference to FIGS. 6 to 12 are not repeatedly described.

Figure 13:
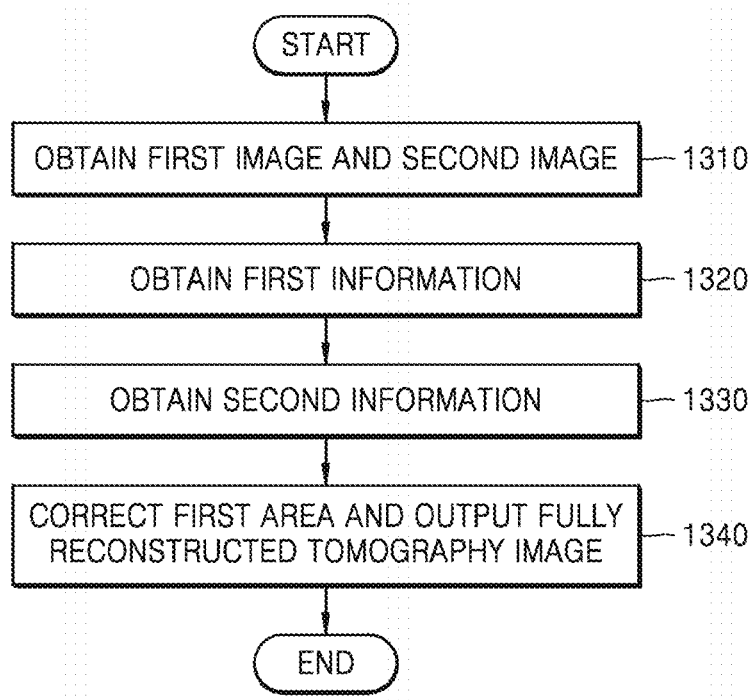
FIG. 13 is a flowchart of a method performed by a tomography apparatus according to an exemplary embodiment.

FIG. 13 is a flowchart of a method performed by the tomography apparatus 600 according to an exemplary embodiment.

Operation 1310 may be performed by the data acquirer 610. Operations 1320 and 1330 may be performed by the controller 620. Operation 1340 may be performed by the image processor 630.

In the operation 1310, the tomography apparatus 600 according to an exemplary embodiment obtains first and second images, which are partial images, by using data respectively obtained at a first angular section corresponding to a first time and at a second angular section corresponding to a second time by performing a tomography scan on a moving object.

In the operation 1320, the tomography apparatus 600 uses the first and second images to obtain first information that indicates a motion amount of the object in a first area of the entire image.

In the operation 1330, the tomography apparatus 600 obtains second information about a degree of blur of at least one point in the object in the first area, based on the first information.

In the operation 1340, the tomography apparatus 600 corrects the first area based on the first information and the second information, and outputs a finally reconstructed tomography image based on the corrected first area. The second information may include a PSF.

The correcting of the first area may include performing a motion correction on the object in the first area with respect to time based on the first information and the second information. Also, the correcting of the first area may include de-blurring the first area. This will be described in detail with reference to FIGS. 15 and 16.

Figure 14:
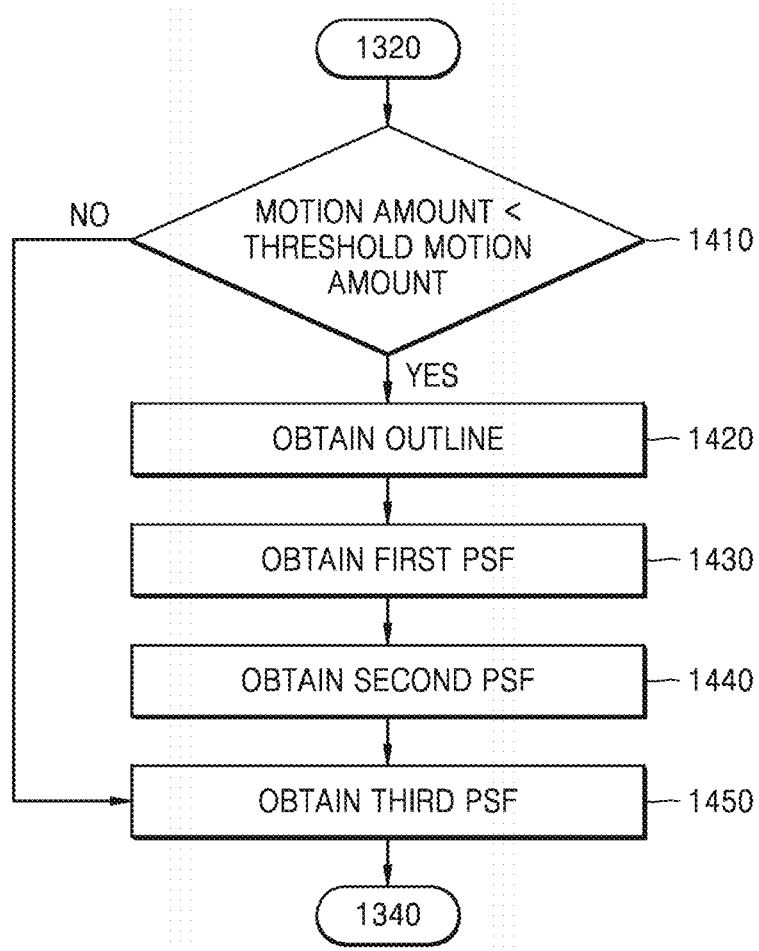
FIG. 14 is a flowchart of a method of obtaining, by a tomography apparatus, second information according to an exemplary embodiment.

FIG. 14 is a flowchart of a method of obtaining, by the tomography apparatus 600, second information according to an exemplary embodiment.

Operations 1410 to 1450 may be performed by the controller 620. The operation 1410 may be performed after the operation 1320 of FIG. 13. The operations 1410 to 1450 may be included in the operation 1330 of FIG. 13.

In the operation 1410, the tomography apparatus 600 compares the motion amount of the object in the first area with the threshold motion amount to determine whether the motion amount is less than the threshold motion amount. Also, the tomography apparatus 600 may set a flag to information that is related to a first area in which the motion amount of the object is less than threshold motion amount. If the motion amount is less than the threshold motion amount, then the tomography apparatus 600 continues in the operation 1420. Otherwise, the tomography apparatus 600 continues in the operation 1450.

In the operation 1420, the tomography apparatus 600 obtains an outline of the object in the first area.

In the operation 1430, the tomography apparatus 600 obtains or estimates the first PSF based on a degree of blur of the outline. For example, the tomography apparatus 600 may be storing information about an original form of the outline of the object. Also, the tomography apparatus 600 may obtain information about the outline of the captured object. The tomography apparatus 600 may estimate the first PSF based on the information about the original form of the outline and the information about the outline of the captured object. That is, the first PSF may be estimated by convoluting the inverse of the image 1030 of FIG. 10C, which is the information about the original form of the outline, and the image 1050 of FIG. 10C, which is the information about the outline of the captured object. The tomography apparatus 600 may include obtaining the second information about the first area based on the first PSF.

In the operation 1440, the tomography apparatus 600 or obtains or estimates the second PSF based on active sparse 3D sampling.

In the operation 1450, the tomography apparatus 600 obtains or estimates the third PSF based on a PSF model of the tomography apparatus 600. The tomography apparatus 600 may obtain the second information of the first area based on the first to third PSFs. For example, the tomography apparatus 600 may obtain a final PSF related to the first area by applying different weighted values to the first to third PSFs. The method of obtaining the final PSF related to the first area based on the first to third PSFs is described above with reference to FIG. 6. The final PSF may be included in the second information.

In the operation 1410, the tomography apparatus 600 may compare the motion amount of the object in the first area with the threshold motion amount. When the motion amount of the object is greater than the threshold motion amount, the tomography apparatus 600 may determine that the motion amount of the object in the first area of the image is large. Also, the tomography apparatus 600 may set a flag to the information related to the first area.

When the motion amount of the object in the first area is greater than or equal to the threshold motion amount, the tomography apparatus 600 may not perform the operations 1420 to 1430. According to another exemplary embodiment, the tomography apparatus 600 may not perform the operations 1420 to 1440. In the operation 1450, the tomography apparatus 600 may estimate the third PSF based on the PSF model of the tomography apparatus 600. Also, the tomography apparatus 600 may obtain the second information about the first area based on the third PSF.

Figure 15:
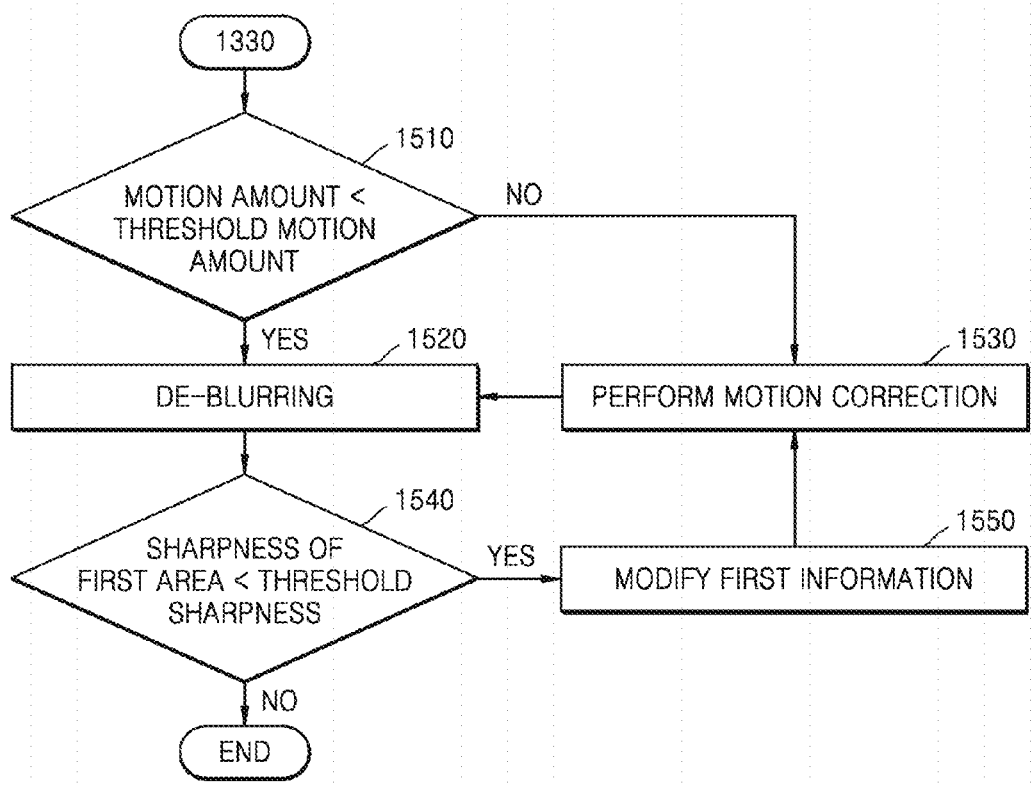
FIG. 15 is a flowchart of a method of correcting, by a tomography apparatus, a first area according to an exemplary embodiment.

FIG. 15 is a flowchart of a method of correcting, by the tomography apparatus 600, a first area according to an exemplary embodiment.

Operations 1510 to 1550 may be performed by the image processor 630. Operations 1510 to 1550 may be performed after the operation 1330 of FIG. 13. The operations 1510 to 1550 may be included in the operation 1340.

In the operation 1510, the tomography apparatus 600 compares the motion amount of the object in the first area with the threshold motion amount to determine whether the motion amount is less than the threshold motion amount. When the motion amount of the object is less than the threshold motion amount, the tomography apparatus 600 continues in the operation 1520. When the motion amount of the object is greater than or equal to the threshold motion amount, the tomography apparatus 600 continues in the operation 1530. Also, because the motion amount of the object in the first area is compared with the threshold motion amount in the operation 1410 of FIG. 14, a result of the operation 1410 may be used in the operation 1510.

When the motion amount is less than the threshold motion amount, the tomography apparatus 600 may determine that the motion amount of the object in the first area of the image is small. That is, the tomography apparatus 600 may determine that there is a small amount of motion artifacts. Therefore, the tomography apparatus 600 may skip the operation 1530.

In the operation 1530, the tomography apparatus 600 performs a motion correction on the first area based on the first information. As described with reference to FIGS. 8A and 8B, the tomography apparatus 600 may obtain the motion amount of the object. Also, the tomography apparatus 600 may obtain an MVF that indicates a motion amount of a portion of the object. The MVF may indicate a motion amount of a surface that forms the object. The tomography apparatus 600 may correct a motion of the object in the entire image based on the first information that includes the motion amount of the surface that forms the object. The tomography apparatus 600 may use, for example, warping. The tomography apparatus 600 continues in operation 1520.

In the operation 1520, the tomography apparatus 600 performs de-blurring of the first area based on the second information. De-blurring refers to a process of removing the blur artifacts. The blur artifacts may be removed based on the second information. For example, the second information includes a PSF as information about blur artifacts. As described with reference to FIGS. 13 and 14, the tomography apparatus 600 may obtain the second information that includes the PSF. The tomography apparatus 600 may remove the blur artifacts from a captured image by using the PSF. For example, with reference to FIG. 10C, the tomography apparatus 600 may capture the image 1050. Also, the tomography apparatus 600 may include the PSF image 1040. The tomography apparatus 600 may obtain the image 1030 by using the image 1050 and the PSF image 1040.

The tomography apparatus 600 may skip the operation 1510 and directly perform the operation 1530.

In the operation 1540, the tomography apparatus 600 compares a sharpness of the de-blurred first area to a threshold sharpness to determine whether the sharpness of the de-blurred first area is less than the threshold sharpness. The sharpness indicates acutance of peripheries in an image or a visibility of subtle parts. The tomography apparatus 600 may digitize the sharpness. The sharpness may be high when the acutance is high. The threshold sharpness is a target acutance of the tomography apparatus 600. The tomography apparatus 600 may store the threshold sharpness in the memory 124 of FIG. 4. The tomography apparatus 600 may receive the threshold sharpness from the communicator 132 of FIG. 4. Alternatively, the tomography apparatus 600 may receive the threshold sharpness from the input interface 128 of FIG. 4.

When the sharpness of the de-blurred first area is less than the threshold sharpness, the tomography apparatus 600 continues in the operation 1550. Otherwise, the tomography apparatus 600 ends the method.

In the operation 1550, the tomography apparatus 600 modifies the first information based on at least one selected from the sharpness of the first area and the second information. Because the modifying of the first information is described with reference to FIG. 12, details of the modifying will not be repeated.

The tomography apparatus 600 may check whether sharpness of some portions that are corrected based on the modified first information is greater than or equal to the threshold sharpness. If the sharpness of some regions are greater than or equal to the threshold sharpness, the motion amount with respect to the entire image may be corrected based on a predetermined vector.

The operation 1530 may be performed after the operation 1550. In the operation 1530, the tomography apparatus 600 may perform a motion correction based on the modified first information. As shown in FIG. 15, the operations 1520 and 1540 may be performed after the operation 1530. Also, when the sharpness of the de-blurred first area is greater than or equal to the threshold sharpness in the operation 1540, the tomography apparatus 600 may output a fully reconstructed tomography image that is corrected. Because the outputting of the fully reconstructed tomography image is described with reference to FIG. 6, the details thereof will not be repeated.

Figure 16:
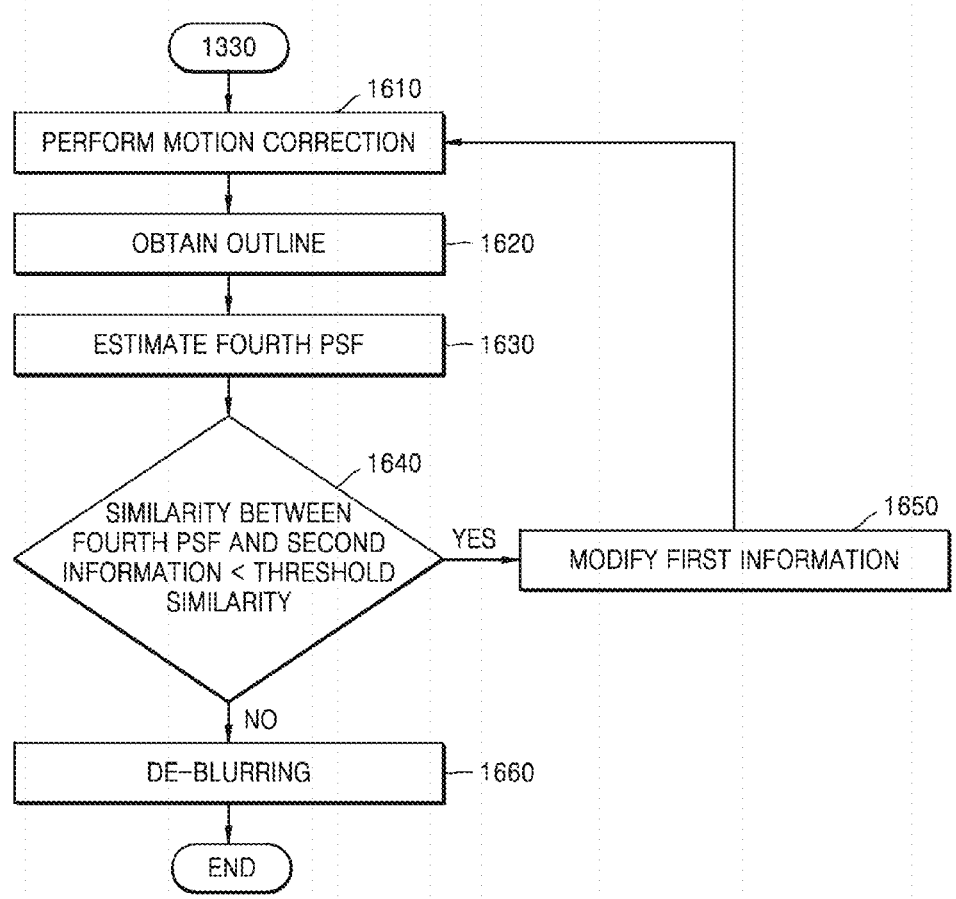
FIG. 16 is a flowchart of a method of correcting, by a tomography apparatus, a first area according to another exemplary embodiment.

FIG. 16 is a flowchart of a method of correcting, by the tomography apparatus 600, a first area according to another exemplary embodiment.

Operations 1610 to 1660 may be performed by the image processor 630. The operations 1610 to 1660 may be performed after the operation 1330 of FIG. 13. The operations 1610 to 1660 may be included in the operation 1340.

In the operation 1610, the tomography apparatus 600 performs a motion correction on the first area based on the first information. As described above, the motion correction may be performed by, for example, warping.

In the operation 1620, the tomography apparatus 600 obtains an outline of an object in the motion-corrected first area.

In the operation 1630, the tomography apparatus 600 estimates the fourth PSF based on the obtained outline.

In the operation 1640, the tomography apparatus 600 determines a similarity between the fourth PSF and second information. Also, in the operation 1640, the tomography apparatus 600 compares the similarity between the fourth PSF and the second information with a threshold similarity to determine whether the similarity between the fourth PSF and the second information is less than the threshold similarity. The tomography apparatus 600 may compare a final PSF in the second information with the fourth PSF. The similarity may be indicated by using correlation. The tomography apparatus 600 may perform de-blurring based on the final PSF in the second information. Therefore, if the fourth PSF of an image is highly correlated with the final PSF, the tomography apparatus 600 may obtain a relatively clearer image. If the similarity between the fourth PSF and the second information is less than the threshold similarity, the tomography apparatus 600 continues in the operation 1650. Otherwise, the tomography apparatus 600 continues in the operation 1660.

In the operation 1650, the tomography apparatus 600 modifies the first information based on the second information. The tomography apparatus 600 may modify a motion amount such that the fourth PSF becomes similar to the final PSF. Because this operation has been described with reference to FIG. 12, details will not be repeated herein.

Also, the tomography apparatus 600 may perform the operation 1610 after the operation 1650. In the operation 1610, the tomography apparatus 600 may perform a motion-correction based on the modified first information.

In the operation 1660, the tomography apparatus 600 performs de-blurring of the first area based on the second information. Also, after de-blurring in the operation 1660, the tomography apparatus 600 may output a final corrected tomography image. Because the outputting of the fully reconstructed tomography image is described with reference to FIG. 6, the details thereof will not be repeated.

A program for implementing the above-described operation method of the tomography apparatus 600 may be recorded in a computer-readable recording medium.

The tomography apparatus 600 according to the exemplary embodiments corrects a tomography image with regard to both motion artifacts and blur artifacts. The tomography apparatus 600 considers first information, which is about motion artifacts, when extracting an outline of an object so that the motion artifacts and the blur artifacts are organically removed. Also, the tomography image apparatus 600 obtains second information, which includes a PSF, from the outline of the object. The tomography apparatus 600 removes the motion artifacts based on the first information and removes the blur artifacts based on the second information. When the tomography image does not satisfy a predetermined sharpness, the tomography apparatus 600 may modify the first information based on the second information, and repeats the process of removing the motion artifacts based on the first information and removing the blur artifacts based on the second information. As a result, a clear image is obtained. The clear image may provide improved visibility of vessel walls, lumen, plaque, etc., and increase diagnosis accuracy.

The term "processor" may include a general-purpose processor, a central processing unit (CPU), a microprocessor, a digital signal processor (DSP), a controller, a microcontroller, a state machine, and the like. In exemplary embodiments, the term "processor" may refer to an application-specific integrated circuit (ASIC), a programmable logic device (PLD), a field-programmable gate array (FPGA), and the like. Also, the term "processor" may refer to a combination of processing devices, for example, a combination of a DSP and a microprocessor, a combination of microprocessors, a combination of a DSP core and at least one microprocessor, and the like.

The term "storage" or "memory" may include any electronic component that may store electronic information. The term "memory" may refer to various types of processor-readable media, for example, a random-access memory (RAM), a read-only memory (ROM), non-volatile RAM (NVRAM), a programmable ROM (PROM), an erasable PROM (EPROM), an electrically erasable ROM (EEPROM), a flash memory, a magnetic or optical data storage device, registers, and the like. If a processor may read or write information from or to a memory, such status between the memory and the processor is referred to as an electronic communication status. A memory that is integrated with a processor is in the electronic communication status.

The terms "command" and "code" may include any type of computer-readable phrases. For example, the terms "command" and "code" may refer to at least one selected from programs, routines, sub-routines, functions, and operations. The terms "command" and "code" may include at least one computer-readable phrase.

In addition, the exemplary embodiments may also be implemented through computer-readable code and/or instructions on a medium, e.g., a computer-readable medium, to control at least one processing element to implement any above-described exemplary embodiments. The medium may correspond to any medium or media that may serve as a storage and/or perform transmission of the computer-readable code.

The computer-readable code may be recorded and/or transferred on a medium in a variety of ways, and examples of the medium include recording media, such as magnetic storage media (e.g., ROM, floppy disks, hard disks, etc.) and optical recording media (e.g., compact disc read only memories (CD-ROMs) or digital versatile discs (DVDs)), and transmission media such as Internet transmission media. Thus, the medium may have a structure suitable for storing or carrying a signal or information, such as a device carrying a bitstream according to one or more exemplary embodiments. The medium may also be on a distributed network, so that the computer-readable code is stored and/or transferred on the medium and executed in a distributed fashion. Furthermore, the processing element may include a processor or a computer processor, and the processing element may be distributed and/or included in a single device.

The foregoing exemplary embodiments are examples and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A tomography apparatus comprising:
   a data acquirer configured to obtain a first partial image and a second partial image of an object, based on data that is obtained respectively at a first angular section corresponding to a first time and at a second angular section corresponding to a second time during a tomography scan of the object that is moving;
   a hardware processor implementing a controller configured to:
      determine first information indicating a motion amount of the object in a first area of an entire image, based on the first partial image and the second partial image; and
      determine second information indicating a degree of blur of a point included in the object in the first area, based on the first information; and
   an image processor configured to:
      correct the first area, based on the first information and the second information; and
      output a tomography image, based on the corrected first area,
   wherein the controller is further configured to:
      determine whether the motion amount of the object is less than a threshold motion amount;
      determine a first outline of the object in the first area, in response to the motion amount of the object being determined to be less than the threshold motion amount;
      determine a first point spread function (PSF), based on the first outline; and
      determine the second information, based on the first PSF.

2. The tomography apparatus of claim 1, wherein the second information comprises a point spread function.

3. The tomography apparatus of claim 1, wherein the controller is further configured to:
   determine a second PSF, based on active sparse three-dimensional PSF sampling;
   determine a third PSF, based on a PSF model of the tomography apparatus; and
   determine the second information, based on the first PSF, the second PSF, and the third PSF.

4. The tomography apparatus of claim 3, wherein the controller is further configured to determine the second information by applying different weighted values to the first PSF, the second PSF, and the third PSF, respectively.

5. The tomography apparatus of claim 3, wherein the controller is further configured to determine the third PSF, based on the PSF model of the tomography apparatus, and determine the second information, based on the third PSF, in response to the motion amount of the object being determined to be greater than or equal to the threshold motion amount.

6. The tomography apparatus of claim 1, wherein the image processor is further configured to:
   perform motion correction on the first area, based on the first information; and
   de-blur the first area, based on the second information.

7. The tomography apparatus of claim 1, wherein the image processor is further configured to:
   perform motion correction on the first area, based on the first information, in response to the motion amount of the object being determined to be greater than or equal to the threshold motion amount; and
   de-blur the first area, based on the second information, in response to the motion amount of the object being determined to be less than the threshold motion amount.

8. The tomography apparatus of claim 7, wherein the image processor is further configured to de-blur the motion-corrected first area, based on the second information.

9. The tomography apparatus of claim 7, wherein the image processor is further configured to:
- determine whether a sharpness of the de-blurred first area is less than a threshold sharpness;
- modify the first information, based on either one or both of the sharpness of the de-blurred first area and the second information, in response to the sharpness of the de-blurred first area being determined to be less than the threshold sharpness; and
- perform the motion correction on the first area, based on the modified first information.

10. The tomography apparatus of claim 1, wherein the image processor is further configured to:
- perform motion correction on the first area, based on the first information;
- determine a second outline of the object in the motion-corrected first area;
- determine a point spread function, based on the second outline;
- determine a similarity between the point spread function and the second information;
- determine whether the similarity is less than a threshold similarity;
- modify the first information, based on the second information, in response to the similarity being determined to be less than the threshold similarity;
- perform the motion correction, based on the modified first information; and
- de-blur the first area, based on the second information, in response to the similarity being determined to be greater than or equal to the threshold similarity.

11. An operation method of a tomography apparatus, the method comprising:
- obtaining a first partial image and a second partial image of an object, based on data that is respectively obtained at a first angular section corresponding to a first time and at a second angular section corresponding to a second time during a tomography scan of the object that is moving;
- determining first information indicating a motion amount of the object in a first area of an entire image, based on the first partial image and the second partial image;
- determining second information indicating a degree of blur of a point included in the object in the first area, based on the first information;
- correcting the first area, based on the first information and the second information; and
- outputting a tomography image, based on the corrected first area,
- wherein the determining the second information comprises:
  - determining whether the motion amount of the object is less than a threshold motion amount;
  - determining a first outline of the object in the first area, in response to the motion amount of the object being determined to be less than the threshold motion amount;
  - determining a first point spread function (PSF), based on the first outline; and
  - determining the second information, based on the first PSF.

12. The method of claim 11, wherein the second information comprises a point spread function.

13. The method of claim 11, wherein the determining the second information further comprises:
- determining a second PSF, based on active sparse three-dimensional PSF sampling;
- determining a third PSF, based on a PSF model of the tomography apparatus; and
- determining the second information, based on the first PSF, the second PSF, and the third PSF.

14. The method of claim 13, wherein the determining the second information further comprises determining the second information by applying different weighted values to the first PSF, the second PSF, and the third PSF, respectively.

15. The method of claim 13, wherein the determining the second information further comprises determining the third PSF, based on the PSF model of the tomography apparatus, and determining the second information, based on the third PSF, in response to the motion amount of the object being determined to be greater than or equal to the threshold motion amount.

16. The method of claim 11, wherein the correcting comprises:
- performing motion correction on the first area, based on the first information; and
- de-blurring the first area, based on the second information.

17. The method of claim 11, wherein the correcting comprises:
- performing motion correction on the first area, based on the first information, in response to the motion amount of the object being determined to be greater than or equal to the threshold motion amount; and
- de-blurring the first area, based on the second information, in response to the motion amount of the object being determined to be less than the threshold motion amount.

18. A non-transitory computer-readable storage medium storing a program configured to be executed by a computer to perform the method of claim 11.

* * * * *